(12) United States Patent
Yamane

(10) Patent No.: US 11,267,586 B2
(45) Date of Patent: Mar. 8, 2022

(54) AIRCRAFT STRUCTURE MANUFACTURING DEVICE

(71) Applicant: MITSUBISHI HEAVY INDUSTRIES, LTD., Tokyo (JP)

(72) Inventor: Shigemi Yamane, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 146 days.

(21) Appl. No.: 16/613,547

(22) PCT Filed: Jun. 16, 2017

(86) PCT No.: PCT/JP2017/022301
§ 371 (c)(1),
(2) Date: Nov. 14, 2019

(87) PCT Pub. No.: WO2018/229969
PCT Pub. Date: Dec. 20, 2018

(65) Prior Publication Data
US 2021/0163153 A1 Jun. 3, 2021

(51) Int. Cl.
*B64F 5/10* (2017.01)
*B25B 11/02* (2006.01)
(Continued)

(52) U.S. Cl.
CPC ............... *B64F 5/10* (2017.01); *B25B 11/02* (2013.01); *B25H 1/10* (2013.01); *B64C 3/26* (2013.01)

(58) Field of Classification Search
CPC .......... B25B 11/00; B25B 11/02; B23P 19/00; B64F 5/10; B64F 5/50; B25H 1/10; B64C 3/26
(Continued)

(56) References Cited

U.S. PATENT DOCUMENTS 6,170,157 B1 1/2001 Munk et al.
6,314,630 B1 11/2001 Munk et al.
(Continued)

FOREIGN PATENT DOCUMENTS

EP 2939786 A1 11/2015
EP 2939931 A1 11/2015
(Continued)

OTHER PUBLICATIONS

International Search Report and Written Opinion for International Application No. PCT/JP2017/022301 dated Aug. 15, 2017; 11pp.

*Primary Examiner* — Tyrone V Hall, Jr.
*Assistant Examiner* — Abbie E Quann
(74) *Attorney, Agent, or Firm* — Kanesaka Berner and Partners LLP

(57) ABSTRACT

An aircraft structure manufacturing device is provided with: a jig supporting a component of an aircraft structure; a plurality of raising/lowering stands; and a control unit for controlling positions of support parts of the raising/lowering stands. The control unit includes: an input unit inputting position information for a movement destination of a reference point provided to the component; a storage unit storing, in advance, master data, which is the relationship for position information of the support parts of respective raising/lowering stands corresponding to the position information for the movement destination; a unit position information acquisition unit acquiring position information for the support part of each of the raising/lowering stands, based on the master data and the position information for the movement destination; and the movement command unit for simultaneously moving the support parts of a plurality of raising/lowering stands.

2 Claims, 15 Drawing Sheets

(51) Int. Cl.
 *B25H 1/10* (2006.01)
 *B64C 3/26* (2006.01)
(58) Field of Classification Search
 USPC .................. 29/281.1–281.6; 269/291, 289 R
 See application file for complete search history.

(56) References Cited

U.S. PATENT DOCUMENTS

| | | | |
|---|---|---|---|
| 9,296,465 | B2 | 3/2016 | Yamane et al. |
| 2011/0302784 | A1* | 12/2011 | Yamane .................... B64F 5/10 |
| | | | 29/897.2 |
| 2013/0185918 | A1* | 7/2013 | Yamane ................. B23P 19/10 |
| | | | 29/464 |
| 2015/0314889 | A1* | 11/2015 | Day ...................... B23P 21/004 |
| | | | 408/1 R |
| 2017/0097099 | A1* | 4/2017 | O'Nan .................. B23P 15/001 |
| 2017/0275026 | A1* | 9/2017 | Szarski ............... B25J 11/0055 |

FOREIGN PATENT DOCUMENTS

| | | |
|---|---|---|
| JP | 2008007114 A | 1/2008 |
| JP | 4128626 B2 | 7/2008 |
| JP | 5112361 B2 | 1/2013 |
| JP | 5769412 B2 | 8/2015 |
| WO | 2012081700 A1 | 6/2012 |

\* cited by examiner

AIRCRAFT STRUCTURE MANUFACTURING DEVICE

RELATED APPLICATIONS

The present application is a National Phase of International Application Number PCT/JP2017/022301 filed Jun. 16, 2017.

TECHNICAL FIELD

The present invention relates to an aircraft structure manufacturing device.

BACKGROUND ART

Patent Documents 1 and 2 disclose a method for assembling a main wing of an aircraft. In the steps of assembling the main wing, a blade panel needs to be positioned with high precision to attach the blade panel to a skeleton structure. To reduce the number of steps, it is desirable to position the blade panel within a short time.

CITATION LIST

Patent Document

Patent Document 1: JP 4128626 B
Patent Document 2: JP 2008-7114 A

SUMMARY OF INVENTION

Technical Problem

However, in conventional methods, when positioning a long component like a blade panel, the operation is complicated by presence of a plurality of raising/lowering stands supporting components. Therefore, it is necessary to manipulate each of the plurality of raising/lowering stands, and it may be difficult to perform high-precision positioning within a short period of time. In contrast, it is desirable to simplify an operation of a worker.

An object of the present invention is to provide an aircraft structure manufacturing device that enables high-precision positioning with simple operation.

Solution to Problem

An aircraft structure manufacturing device according to a first aspect of the present invention includes: a jig configured to support a component of an aircraft structure; a plurality of raising/lowering stands arranged apart from each other in a horizontal direction, the plurality of raising/lowering stands including support parts being movable in a state in which the jig is supported; and a control unit configured to control positions of the support parts of the plurality of raising/lowering stands, wherein the control unit includes: an input unit configured to input position information for a movement destination for moving a reference point provided on a component of the aircraft structure; a storage unit configured to store, in advance, master data, which is a relationship for position information for the movement destination and position information for the support parts of respective raising/lowering stands; a unit position information acquisition unit configured to acquire position information for the support parts of respective raising/lowering stands, based on the position information for the movement destination input to the input unit and the master data stored in the storage unit; and a movement command unit configured to simultaneously move the support parts of the plurality of raising/lowering stands, based on the position information for the support parts acquired by the unit position information acquisition unit.

With such a configuration, by inputting the position information for the movement destination of the reference point into the input unit, the position information for the support parts of the plurality of raising/lowering stands is acquired via the master data together by the unit position information acquisition unit. The plurality of raising/lowering stands are driven simultaneously based on the acquired position information for the plurality of support parts, and thus, the components of the aircraft structure can be moved to the designated positions. Accordingly, the position of the components of the aircraft structure can be moved without inputting the amount of movement of the support parts with respect to each of the plurality of raising/lowering stands. In other words, the positions of the components of the aircraft structure can be moved by driving together the plurality of raising/lowering stands by a single input operation.

Furthermore, in the aircraft structure manufacturing device according to a second aspect of the present invention, in the first aspect, the component of the aircraft structure may be a panel member that forms an outer surface of a wing of an aircraft.

With such a configuration, the panel member and a girder member can be positioned with high precision by simple operation of one worker even with a large structure such as a wing of an aircraft.

Furthermore, in an aircraft structure manufacturing device according to a third aspect of the present invention, in the first or second aspect, included may be an imaging unit configured to acquire an image of the reference point; and a display unit configured to display an image acquired by the imaging unit and a preset marking.

With such a configuration, the actual position of the components of the aircraft structure can be easily confirmed by displaying the image of the reference point on the monitor screen.

Advantageous Effect of Invention

According to the present invention, high-precision positioning can be performed with simple operation.

DESCRIPTION OF EMBODIMENTS

First Embodiment

Embodiments of the present invention will be described below with reference to the drawings. First, an aircraft structure manufactured by an aircraft structure manufacturing device 10 according to an embodiment of the present invention will be described. In the present embodiment, an example of a case in which a wing of an aircraft (for example, a main wing 1) is manufactured as an aircraft structure will be described.

Figure 1:
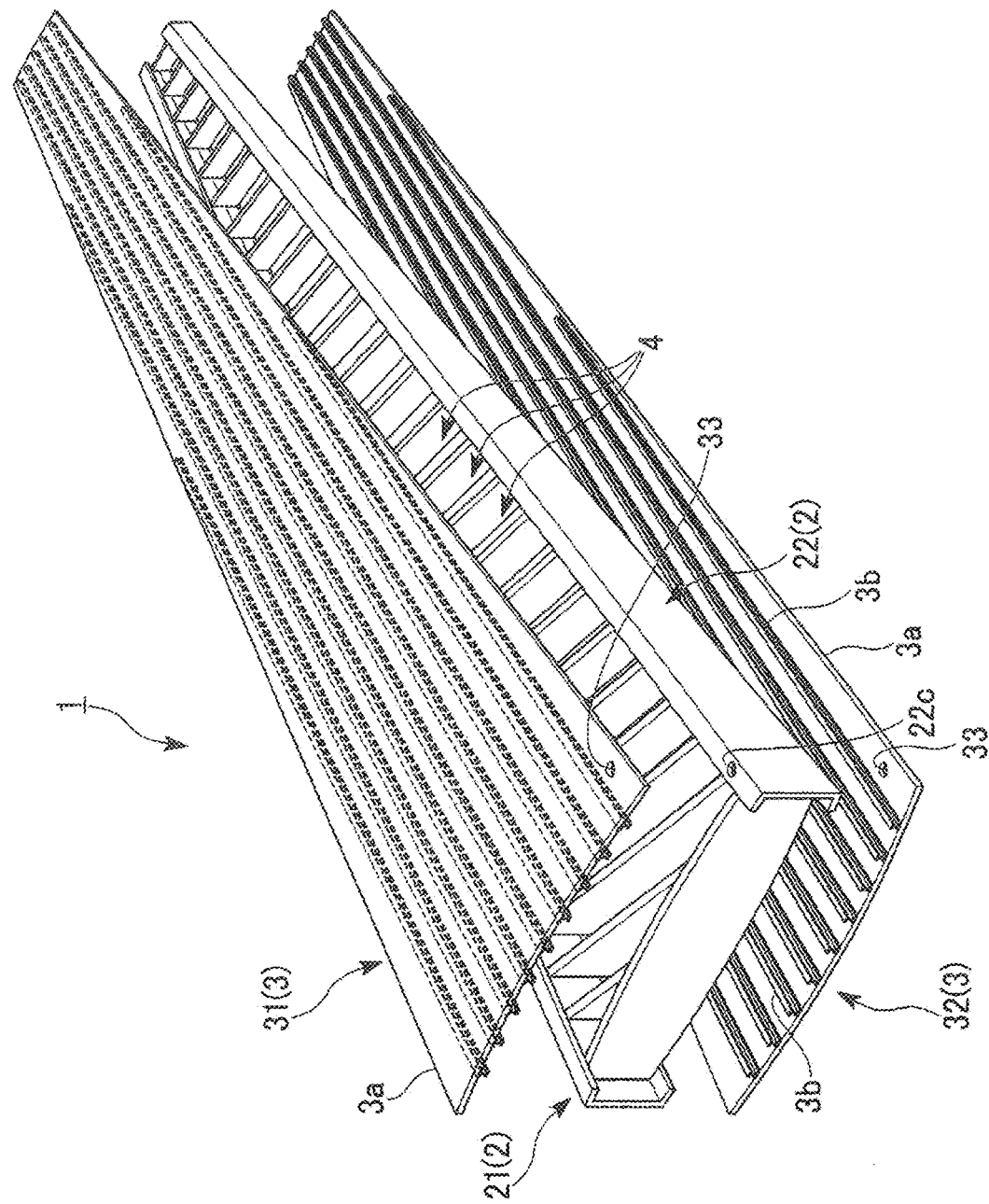
FIG. 1 is an exploded perspective view illustrating a schematic configuration of a main wing according to an embodiment of the present invention.

FIG. 1 is an exploded perspective view illustrating a schematic configuration of the main wing 1. The main wing 1 includes, as components, a pair of spars (girder members) 2 disposed in the longitudinal direction of the main wing 1, a pair of panels 3 forming an upper surface and a lower surface of the main wing 1, and a plurality of ribs 4 provided in the main wing 1.

The spars 2 are attachable to the panels 3. The pair of spars 2 forms both side portions along the longitudinal direction of the main wing 1. As illustrated in FIG. 1, the pair of spars 2 includes a front spar 21 forming the side portion on the aircraft front side of the both side portions of the main wing 1, and a rear spar 22 forming the side portion on the aircraft rear side.

Figure 2:
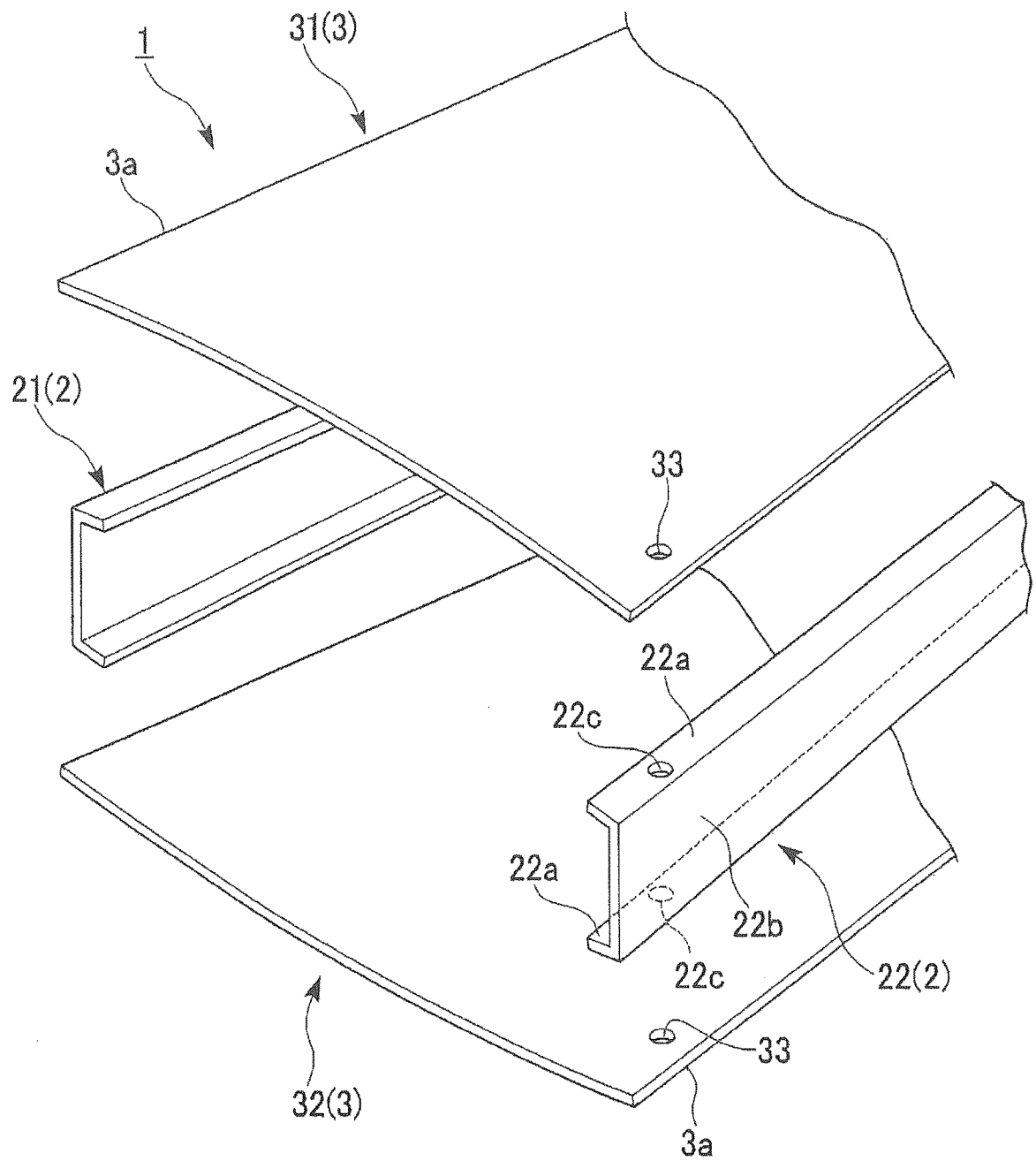
FIG. 2 is a perspective view schematically illustrating a base end portion of the main wing.

Here, FIG. 2 is a perspective view schematically illustrating a base end portion of the main wing 1, that is, an end portion on the aircraft fuselage side. Note that in FIG. 2, the ribs 4 in FIG. 1 are omitted from illustration. The front spar 21 and the rear spar 22 are both longitudinal members having a substantially U-shaped cross section. Each of the front spar 21 and the rear spar 22 includes a pair of parallel pieces 22a arranged in parallel to each other at a predetermined interval, and a connection piece 22b that connects one end portion of the parallel pieces 22a. The parallel pieces 22a are plate-like members extending in the horizontal direction. The connection piece 22b is a plate-like member extending in the vertical direction. The connection piece 22b and the pair of parallel pieces 22a are integrally formed. Reference holes 22c that penetrate vertically the pair of parallel pieces 22a are formed in the base end portion of the rear spar 22. The reference holes 22c are round holes penetrating the rear spar 22 in the vertical direction. The front spar 21 and the rear spar 22 are disposed at an interval in the horizontal direction so that the recesses each formed by the parallel pieces 22a and the connection piece 22b face each other.

The panels 3 are panel members that form the outer surfaces of the wing of the aircraft. As illustrated in FIG. 1, the pair of panels 3 includes an upper panel 31 that forms an upper surface of the main wing 1, and a lower panel 32 that forms a lower surface. The upper panel 31 and the lower panel 32 each include a panel main body 3a having a curved cross-sectional shape and a plurality of stringers 3b provided to extend in the longitudinal direction on one surface of the panel main body 3a.

Here, each of the panel main bodies 3a is formed with a substantially trapezoidal shape such that the width gradually narrows from the base end side toward the tip end side in a plan view, and the panel main body 3a form complex three-dimensional curved surface shapes. The panel main body 3a is formed with substantially the same shape in a plan view in the lower panel 32 and the upper panel 31. A reference point provided on the component of the aircraft structure is provided at the base end portion of each panel main body 3a. The reference point in present embodiment is a target hole 33 vertically penetrating the panel main body 3a. The target holes 33 are formed at positions corresponding to the reference holes 22c of the rear spar 22.

The stringers 3b have substantially H-shaped cross sections in order to increase the bending rigidity of the upper panel 31 and the lower panel 32.

Figure 3:
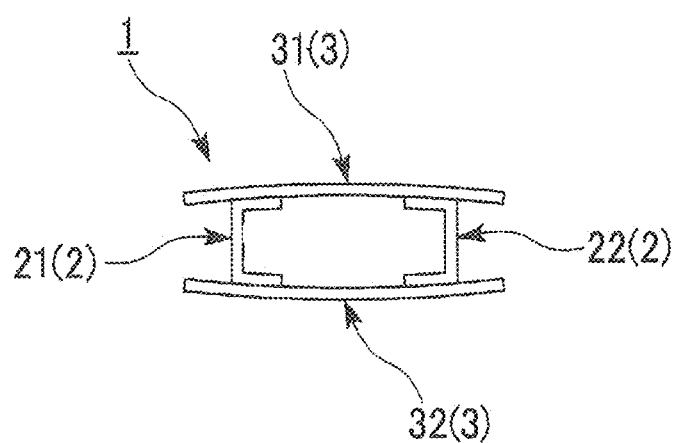
FIG. 3 is a cross-sectional view schematically illustrating a tip end portion of the main wing.

The upper panel 31 and the lower panel 32 configured in this manner are disposed to cover the upper and lower portions of the pair of spars 2 with the stringers 3b facing inward. FIG. 3 is a cross-sectional view schematically illustrating a tip end portion of the main wing 1, that is, an end portion on the opposite side of the aircraft fuselage. At the tip end portion of the main wing 1, both ends in the width direction of the upper panel 31 and the lower panel 32 protrude outward by a predetermined distance from the pair of spars 2.

The plurality of ribs 4 illustrated in FIG. 1 are configured to structurally reinforce the main wing 1. The ribs 4 are provided at a predetermined interval in the longitudinal direction of the main wing 1. One end of each of the ribs 4 is connected to the front spar 21. The other end of each of the ribs 4 is connected to the rear spar 22. As a result, the front spar 21 and the rear spar 22 are held at a regular interval.

Next, with reference to FIG. 4, the aircraft structure manufacturing device 10 according to the first embodiment of the present invention will be described. In the aircraft structure manufacturing device 10, the X, Y, and Z orthogonal coordinate system fixed to a floor is defined. The X-axis direction is a first horizontal direction and the longitudinal direction of the main wing 1. The Y-axis direction is a second horizontal direction perpendicular to the first horizontal direction and is the lateral direction of the main wing 1. The Z-axis direction is the vertical direction.

The aircraft structure manufacturing device 10 includes a lower panel support part (dolly) 200, a plurality of lower raising/lowering stands 300, an upper panel adsorption unit 400, a plurality of upper raising/lowering stands 500, a front spar holding portion 600, a rear spar holding portion 700, a transport unit 800, and a control unit 900.

Figure 5:
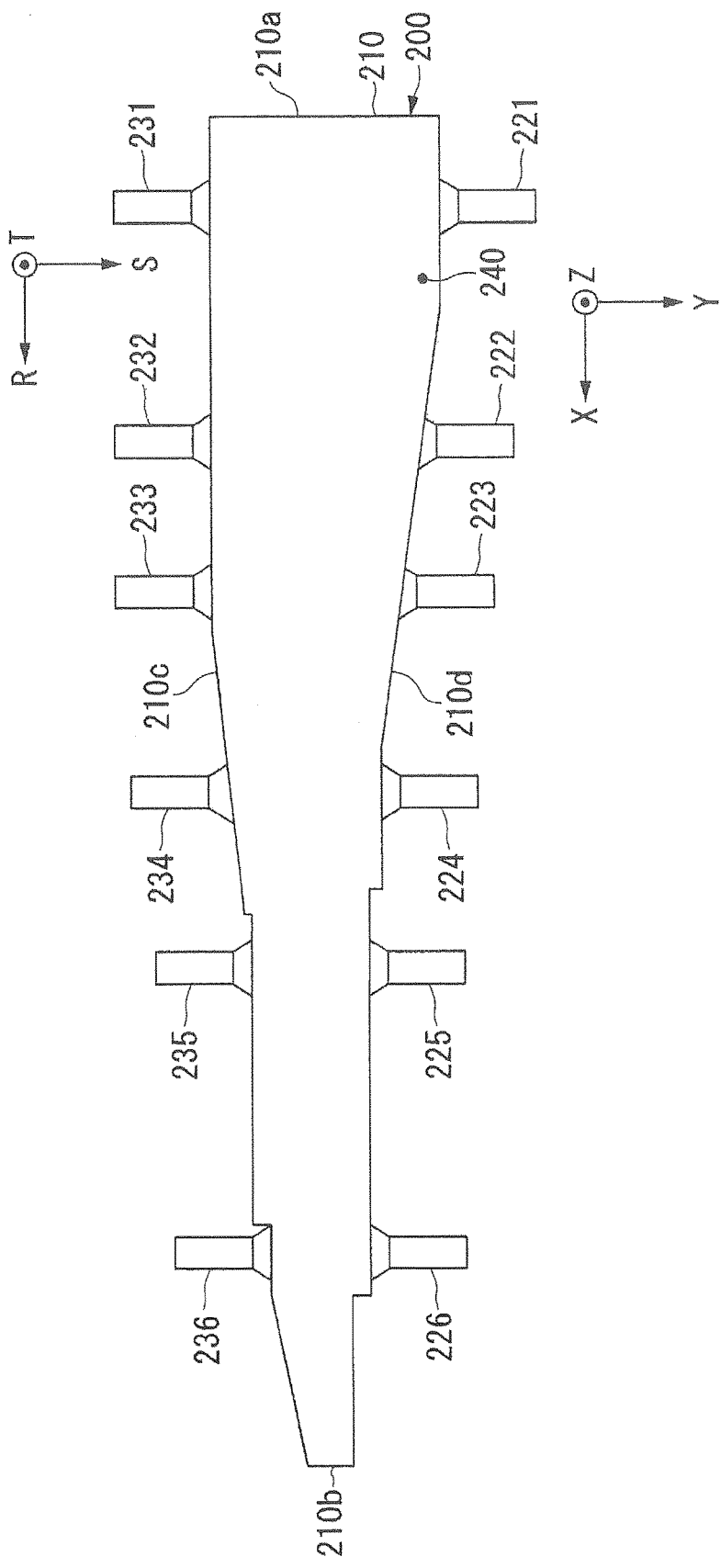
FIG. 5 is a top view of a lower panel support part included in the aircraft structure manufacturing device.

The lower panel support part 200 is a jig that supports the lower panel 32 constituting the main wing 1 from below. As illustrated in FIG. 5, the lower panel support part 200 includes a dolly main body 210 on which the lower panel 32 is mounted. In the aircraft structure manufacturing device 10, the R, S, and T orthogonal coordinate system that is fixed to the dolly main body 210 is defined. In the R, S, and T orthogonal coordinate system, in a case where the dolly main body 210 is disposed horizontally, the R-axis coincides with the X-axis, the S-axis coincides with the Y-axis, and the T-axis coincides with the Z-axis. The dolly main body 210 includes a main body trunk portion 210a, a main body blade end portion 210b, a main body leading edge portion 210c, and a main body trailing edge portion 210d.

The main body trunk portion 210a and the main body blade end portion 210b are end portions located on both sides of the dolly main body 210 in the R-axis direction. The main body leading edge portion 210c and the main body trailing edge portion 210d are end portions located on both sides of the dolly main body 210 in the S-axis direction. The dolly main body 210 extends from the main body trunk portion 210a to the main body blade end portion 210b to have a longitudinal shape in the R-axis direction.

A jig reference point 240 is defined in the dolly main body 210. The lower panel 32 is mounted on the dolly main body 210 such that a target hole 33 coincides with the jig reference point 240. The body side of the lower panel 32 is disposed above the main body trunk portion 210a on the dolly main body 210. A blade end side of the lower panel 32 is disposed above the main body blade end portion 210b on the dolly main body 210. A leading edge side of the lower panel 32 is disposed above the main body leading edge portion 210c on the dolly main body 210. A trailing edge side of the lower panel 32 is disposed above the main body trailing edge portion 210d of the dolly main body 210.

The lower panel support part 200 includes a first rear supported part 221, a second rear supported part 222, a third rear supported part 223, a fourth rear supported part 224, a fifth rear supported part 225, and a sixth rear supported part 226 that are arranged with intervals from the main body trunk portion 210a toward the main body blade end portion 210b along the main body trailing edge portion 210d. The lower panel support part 200 includes a first front supported part 231, a second front supported part 232, a third front supported part 233, a fourth front supported part 234, a fifth front supported part 235, and a sixth front supported part 236 that are arranged at intervals from the main body trunk portion 210a toward the main body blade end portion 210b along the main body leading edge portion 210c. The positions of the first rear supported part 221 and the first front supported part 231 in the R-axis direction are the same. The positions of the second rear supported part 222 and the second front supported part 232 in the R-axis direction are the same. The positions of the third rear supported part 223 and the third front supported part 233 in the R-axis direction are the same. The positions of the fourth rear supported part 224 and the fourth front supported part 234 in the R-axis direction are the same. The positions of the fifth rear supported part 225 and the fifth front supported part 235 in the R-axis direction are the same. The positions of the sixth rear supported part 226 and the sixth front supported part 236 in the R-axis direction are the same.

Figure 4:
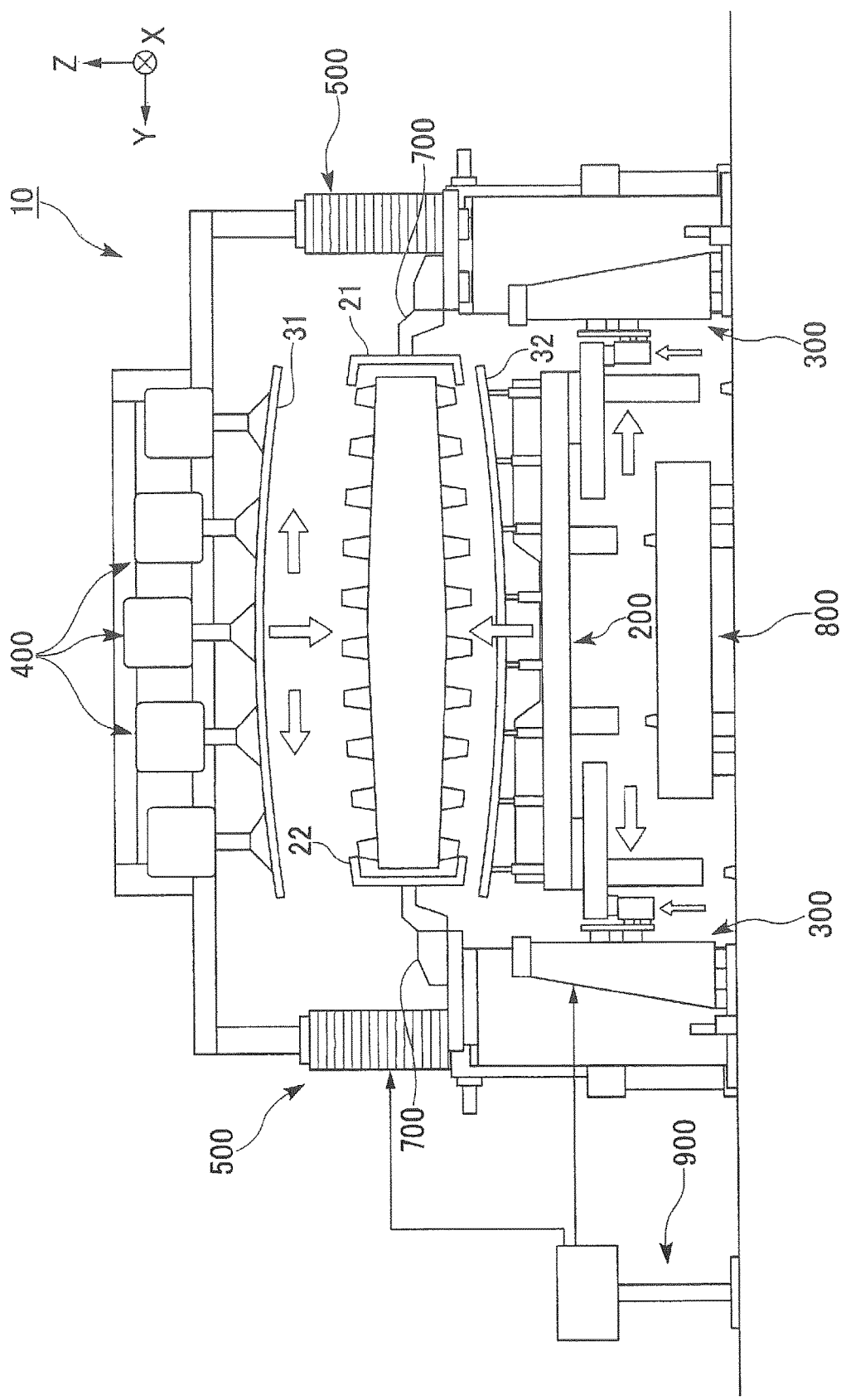
FIG. 4 is a schematic front view illustrating a configuration of an aircraft structure manufacturing device according to a first embodiment of the present invention.

As illustrated in FIG. 4, the lower raising/lowering stands 300 are raising/lowering stands that control operation of the lower panel 32 supported by the lower panel support part 200. The lower raising/lowering stands 300 perform the positioning of the lower panel support part 200 with respect to the translational tri-axis and the rotary tri-axis based on numerical information. The lower raising/lowering stands 300 move and rotate the lower panel support part 200 with the reference of the virtual orthogonal coordinate system defined by the control unit 900 described below aligned with the jig reference point 240. As a result, the position of the lower panel support part 200 being reference of the movement coincides with the position of the target hole 33 of the lower panel 32. A plurality of the lower raising/lowering stands 300 are disposed being separated from each other in the X-axis direction.

In the present embodiment, the lower raising/lowering stands 300 include two first lower raising/lowering stands 30A, one second lower raising/lowering stand 30B, and nine third lower raising/lowering stands 30C. The first lower raising/lowering stands 30A are provided so as to correspond to the first rear supported part 221 and the first front supported part 231, respectively. The second lower raising/lowering stand 30B is provided on the fifth rear supported part 225. The third lower raising/lowering stands 30C are provided so as to correspond to the second rear supported part 222, the third rear supported part 223, the fourth rear supported part 224, the sixth rear supported part 226, and the second front supported part 232, the third front supported part 233, the fourth front supported part 234, the fifth front supported part 235, and the sixth front supported part 236, respectively. That is, in the present embodiment, twelve raising/lowering stands support the lower panel support part 200 as the lower raising/lowering stands 300.

Figure 6:
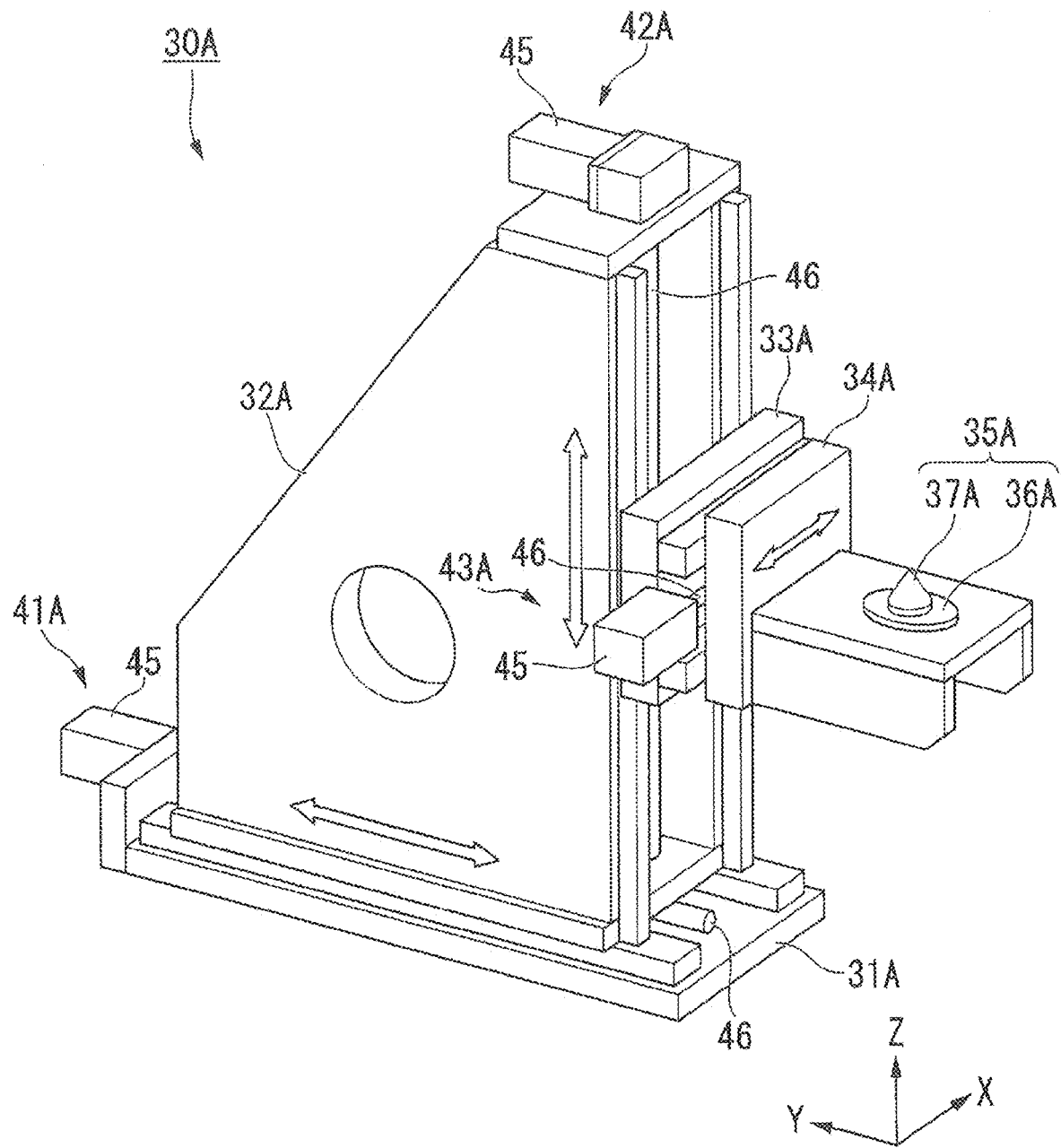
FIG. 6 is a perspective view of a first lower raising/lowering stand.

As illustrated in FIG. 6, each of the first lower raising/lowering stands 30A includes a base 31A, a Y-axis sliding unit 32A, a Z-axis sliding unit 33A, an X-axis sliding unit 34A, a dolly receiving portion (support part) 35A, a Y-axis servo device 41A, a Z-axis servo device 42A, and an X-axis servo device 43A.

The base 31A is fixed to the floor. The base 31A supports the Y-axis sliding unit 32A. The base 31A is capable of guiding the Y-axis sliding unit 32A linearly in the Y-axis direction.

The Y-axis sliding unit 32A supports the Z-axis sliding unit 33A. The Y-axis sliding unit 32A is capable of guiding the Z-axis sliding unit 33A linearly in the Z-axis direction.

The Z-axis sliding unit 33A supports the X-axis sliding unit 34A. The Z-axis sliding unit 33A is capable of guiding the X-axis sliding unit 34A linearly in the X-axis direction.

The X-axis sliding unit 34A supports the dolly receiving portion 35A. The X-axis sliding unit 34A is integrally formed with the dolly receiving portion 35A.

The dolly receiving portion 35A is integrally movable with the X-axis sliding unit 34A. The dolly receiving portion 35A includes a receiving seat 36A and a pin 37A. The central axis of the pin 37A is parallel to the Z-axis direction. The dolly receiving portion 35A is movable in a state of supporting the lower panel support part 200. The dolly receiving portion 35A of the present embodiment is configured to be movable in a state in which the first rear supported part 221 and the first front supported part 231 are supported.

Each of the Y-axis servo device 41A, the Z-axis servo device 42A, and the X-axis servo device 43A includes a servo motor 45 and a ball screw 46.

The Y-axis servo device 41A is provided on the base 31A. The Y-axis servo device 41A drives the Y-axis sliding unit 32A in the Y-axis direction relative to the base 31A to move the position. A limit switch (not illustrated) that limits the stroke (movement range) in the Y-axis direction of the Y-axis sliding unit 32A is provided on the base 31A. The Y-axis servo device 41A stops the Y-axis sliding unit 32A, based on a signal from the limit switch. As a result, the dolly receiving portion 35A stops moving in the Y-axis direction.

The Z-axis servo device 42A is provided on the Y-axis sliding unit 32A. The Z-axis servo device 42A drives the Z-axis sliding unit 33A in the Z-axis direction relative to the Y-axis sliding unit 32A to move the position. A limit switch (not illustrated) that limits the stroke in the Z-axis direction of the Z-axis sliding unit 33A is provided on the Y-axis sliding unit 32A. The Z-axis servo device 42A stops the Z-axis sliding unit 33A, based on a signal from the limit switch. As a result, the dolly receiving portion 35A stops moving in the Z-axis direction.

The X-axis servo device 43A is provided on the Z-axis sliding unit 33A. The X-axis servo device 43A drives the X-axis sliding unit 34A with the dolly receiving portion 35A in the X-axis direction relative to the Z-axis sliding unit 33A to move the position. A limit switch (not illustrated) that limits the stroke in the X-axis direction of the X-axis sliding unit 34A is provided on the Z-axis sliding unit 33A. The X-axis servo device 43A stops the X-axis sliding unit 34A, based on a signal from the limit switch. As a result, the dolly receiving portion 35A stops moving in the X-axis direction.

Thus, the dolly receiving portion 35A is movable to any position in the Y-axis direction, the Z-axis direction, and the X-axis direction by the Y-axis servo device 41A, the Z-axis servo device 42A, and the X-axis servo device 43A.

Figure 7:
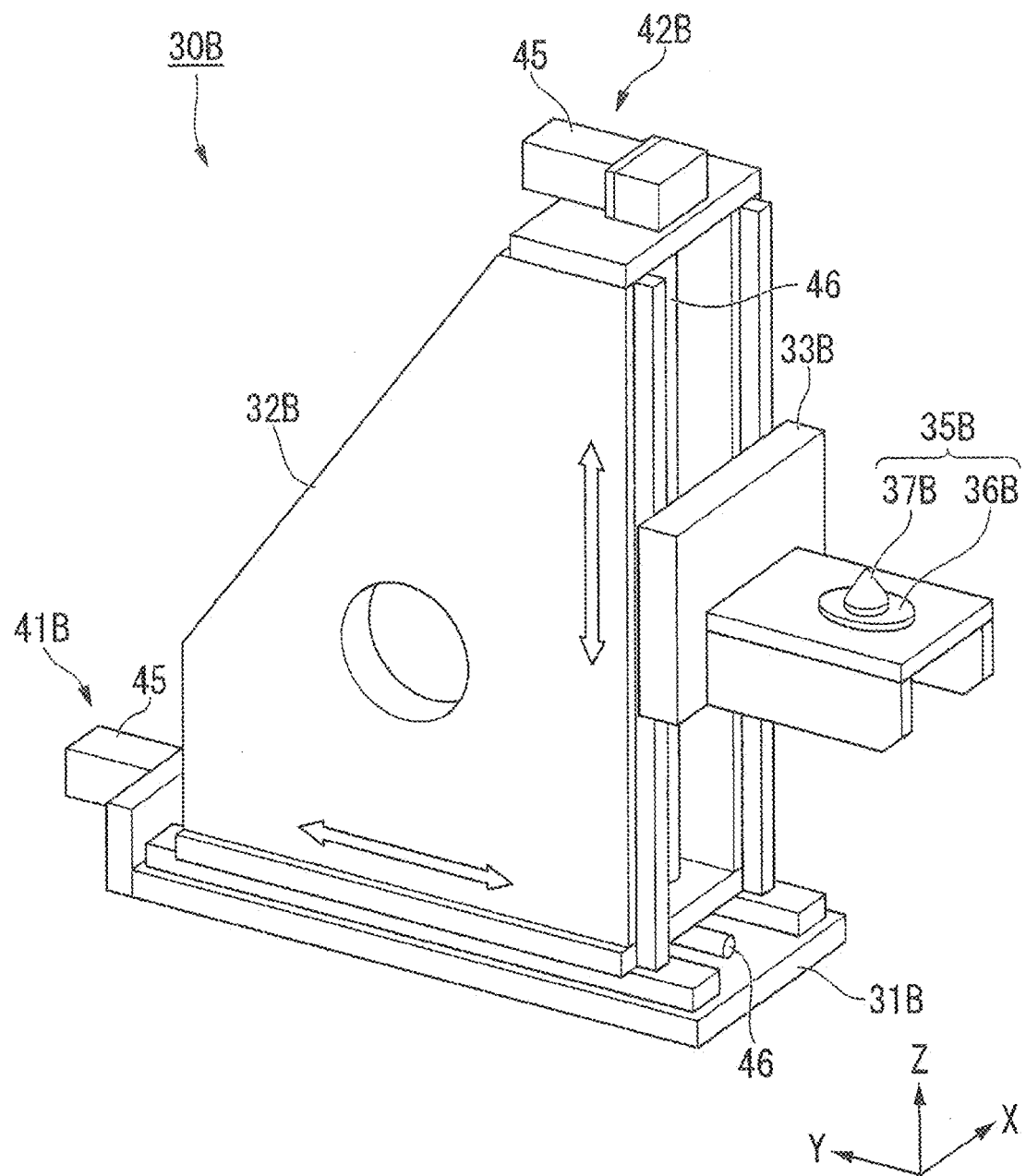
FIG. 7 is a perspective view of a second lower raising/lowering stand.

As illustrated in FIG. 7, the second lower raising/lowering stand 30B includes a base 31B, a Y-axis sliding unit 32B, a Z-axis sliding unit 33B, a dolly receiving portion (support part) 35B, a Y-axis servo device 41B, and a Z-axis servo device 42B.

The base 31B is fixed to the floor. The base 31B supports the Y-axis sliding unit 32B. The base 31B is capable of guiding the Y-axis sliding unit 32B linearly in the Y-axis direction.

The Y-axis sliding unit 32B supports the Z-axis sliding unit 33B. The Y-axis sliding unit 32B is capable of guiding the Z-axis sliding unit 33B linearly in the Z-axis direction.

The Z-axis sliding unit 33B supports the dolly receiving portion 35B. The Z-axis sliding unit 33B is integrally formed with the dolly receiving portion 35B.

The dolly receiving portion 35B is integrally movable with the Z-axis sliding unit 33B. The dolly receiving portion 35B includes a receiving seat 36B and a pin 37B. The central axis of the pin 37B is parallel to the Z-axis direction. The dolly receiving portion 35B is movable in a state of supporting the lower panel support part 200. The dolly receiving portion 35B of the present embodiment is configured to be movable in a state of supporting the fifth rear supported part 225.

Each of the Y-axis servo device 41B and the Z-axis servo device 42B includes a servo motor 45 and a ball screw 46.

The Y-axis servo device 41B is provided on the base 31B. The Y-axis servo device 41B drives the Y-axis sliding unit 32B in the Y-axis direction relative to the base 31B to move the position. A limit switch (not illustrated) that limits the stroke (movement range) in the Y-axis direction of the Y-axis sliding unit 32B is provided on the base 31B. The Y-axis servo device 41B stops the Y-axis sliding unit 32B, based on a signal from the limit switch. As a result, the dolly receiving portion 35B stops moving in the Y-axis direction.

The Z-axis servo device 42B is provided on the Y-axis sliding unit 32B. The Z-axis servo device 42B drives the Z-axis sliding unit 33B in the Z-axis direction relative to the Y-axis sliding unit 32B to move the position. A limit switch (not illustrated) that limits the stroke in the Z-axis direction of the Z-axis sliding unit 33B is provided on the Y-axis sliding unit 32B. The Z-axis servo device 42B stops the Z-axis sliding unit 33B, based on a signal from the limit switch. As a result, the dolly receiving portion 35B stops moving in the Z-axis direction.

Thus, the dolly receiving portion 35B is movable to any position in the Y-axis direction and the Z-axis direction by the Y-axis servo device 41B and the Z-axis servo device 42B. Thus, in the second lower raising/lowering stand 30B, the dolly receiving portion 35B is not movable in the X-axis direction and is movable only in the Y-axis direction and the Z-axis direction.

Figure 8:
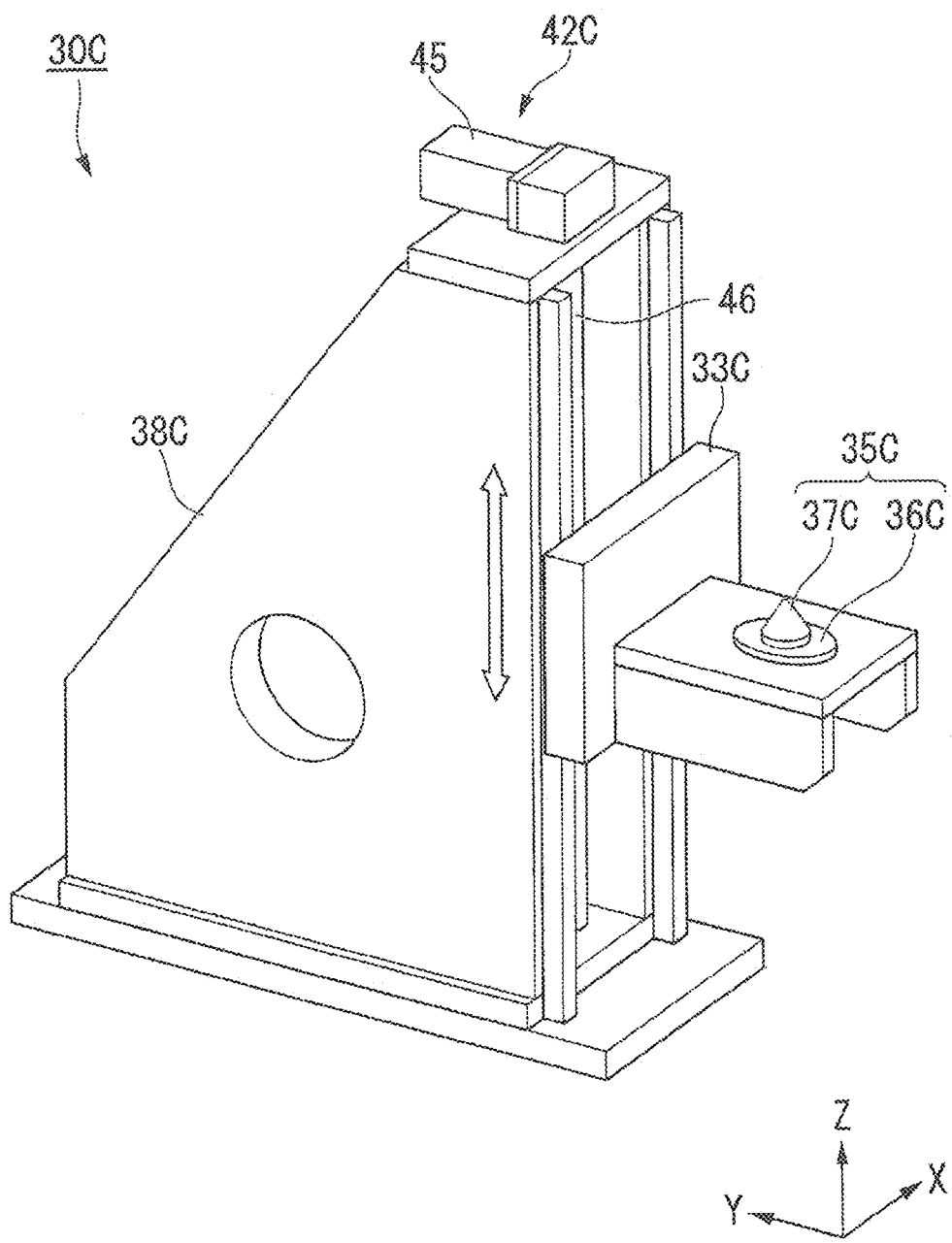
FIG. 8 is a perspective view of a third lower raising/lowering stand.

As illustrated in FIG. 8, each of the third lower raising/lowering stands 30C includes a sliding unit support part 38C, a Z-axis sliding unit 33C, a dolly receiving portion (support part) 35C, and a Z-axis servo device 42C.

The sliding unit support part 38C is fixed to the floor. The sliding unit support part 38C supports the Z-axis sliding unit 33C. The sliding unit support part 38C is capable of guiding the Z-axis sliding unit 33C linearly in the Z-axis direction.

The Z-axis sliding unit 33C supports the dolly receiving portion 35C. The Z-axis sliding unit 33C is integrally formed with the dolly receiving portion 35C.

The dolly receiving portion 35C is integrally movable with the Z-axis sliding unit 33C. The dolly receiving portion 35C includes a receiving seat 36C and a pin 37C. The central axis of the pin 37C is parallel to the Z-axis direction. The dolly receiving portion 35C is movable in a state of supporting the lower panel support part 200. The dolly receiving portion 35C according to the present embodiment is movable in a state of supporting any of the second rear supported part 222, the third rear supported part 223, the fourth rear supported part 224, and the sixth rear supported part 226, and the second front supported part 232, the third front supported part 233, the fourth front supported part 234, the fifth front supported part 235, and the sixth front supported part 236.

Each Z-axis servo device 42C includes a servo motor 45 and a ball screw 46. The Z-axis servo device 42C is provided on the sliding unit support part 38C. The Z-axis servo device 42C drives the Z-axis sliding unit 33C in the Z-axis direction relative to the sliding unit support part 38C to move the position. A limit switch (not illustrated) that limits the stroke in the Z-axis direction of the Z-axis sliding unit 33C is provided on the sliding unit support part 38C. The Z-axis servo device 42C stops the Z-axis sliding unit 33C, based on a signal from the limit switch. As a result, the dolly receiving portion 35C stops moving in the Z-axis direction.

In this way, the dolly receiving portion 35C is movable to any position in the Z-axis direction by the Z-axis servo device 42B. Thus, in the third lower raising/lowering stand 30C, the dolly receiving portion 35C is not movable in the X-axis direction and the Y-axis direction, and is movable only in the Z-axis direction.

As illustrated in FIG. 4, the upper panel adsorption unit 400 is a jig that adsorbs and holds the upper panel 31 that constitutes the main wing 1. In the aircraft structure manufacturing device 10, the R, S, and T orthogonal coordinate system fixed with respect to the upper panel adsorption unit 400 is defined independently from the lower panel support part 200.

The upper raising/lowering stands 500 are raising/lowering stands that control the operation of the upper panel 31 held by the upper panel adsorption unit 400. Similar to the lower raising/lowering stands 300, the upper raising/lowering stands 500 perform the positioning of the upper panel adsorption unit 400 with respect to the translating tri-axis and the rotary tri-axis, based on numerical information. The upper raising/lowering stands 500 move and rotate the upper panel adsorption unit 400 with the reference of the virtual orthogonal coordinate system defined by the control unit 900 described below aligned with the target hole 33 of the upper panel 31 adsorbed by the upper panel adsorption unit 400. A plurality of upper raising/lowering stands 500 being separated from each other in the X-axis direction, are disposed. In the present embodiment, similar to the lower raising/lowering stands 300, the upper raising/lowering stands 500 include two first upper raising/lowering stands, nine second upper raising/lowering stands, and one third upper raising/lowering stand. The configuration of the first upper raising/lowering stands, the second upper raising/lowering stands, and the third upper raising/lowering stand are similar to the configurations of the first lower raising/lowering stands 30A, the second lower raising/lowering stand 30B, and the third raising/lowering stands 30C, respectively, and thus, descriptions thereof will be omitted.

The front spar holding portion 600 and the rear spar holding portion 700 are jigs that hold the front spar 21 and the rear spar 22 constituting the main wing 1 from the sides so as to face the opening. The front spar holding portion 600 and the rear spar holding portion 700 are provided so as to be able to move back and forth in the Y-axis direction.

The transport unit 800 is automated guided vehicle (AGV) that is provided to be capable of traveling in a direction substantially orthogonal to the paper surface of FIG. 4. The transport unit 800 transports in and/or out the lower panel support part 200 in a state of supporting the lower panel 32.

The control unit 900 controls the positions of the support parts in the plurality of raising/lowering stands. The control unit 900 collectively controls the positions of the plurality of support parts in accordance with input amounts of movement of a component (the target hole 33 in the present embodiment). The control unit 900 according to the present embodiment collectively controls the plurality of lower raising/lowering stands 300. The control unit 900 collectively controls the plurality of upper raising/lowering stands 500. The control unit 900 independently controls the lower raising/lowering stands 300 group and the upper raising/lowering stands 500 group.

Figure 9:
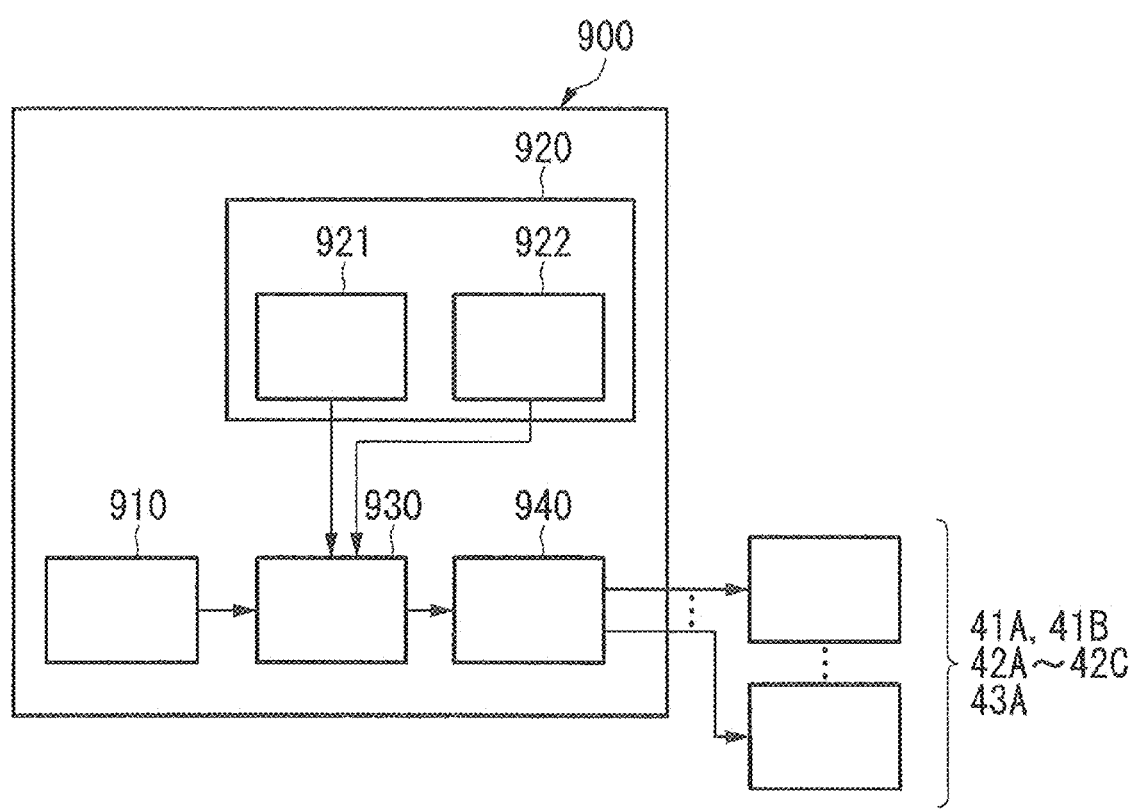
FIG. 9 is a block diagram of a control unit according to the first embodiment.

In the present embodiment, a case in which the lower raising/lowering stands 300 are controlled is described as an example. Note that, in the control unit 900, the description is omitted for the case in which the upper raising/lowering stands 500 are controlled, but the control is performed in the same manner as in the case where the lower raising/lowering stands 300 are controlled. In a case of controlling the lower raising/lowering stands 300, the control unit 900 controls the positions of the dolly receiving portions 35A, 35B, and 35C synchronously by controlling all of the Y-axis servo devices 41A and 41B, the Z-axis servo devices 42A, 42B, and 42C, and the X-axis servo device 43A included in the first lower raising/lowering stands 30A, the second lower raising/lowering stand 30B, and the third raising/lowering stands 30C. As illustrated in FIG. 9, the control unit 900 according to the first embodiment includes an input unit 910, a storage unit 920, a unit position information acquisition unit 930, and a movement command unit 940.

The input unit 910 is input with position information for a movement destination to move a reference point provided on a component of the aircraft structure. The input unit 910 according to the present embodiment is an operation device operable by a worker such as an operator. Specifically, the input unit 910 includes a monitor screen or a control panel (not illustrated), for example. This allows the worker to operate the control panel while viewing the monitor screen. The input unit 910 is input by the worker with position information for a movement destination of the target hole 33 of the lower panel 32 supported by the dolly receiving portions 35A, 35B, and the 35C via the lower panel support part 200, as position information for a movement destination of the reference point of the component. The position information for the movement destination of the target hole 33 input to the input unit 910 is output to the unit position information acquisition unit 930.

The storage unit 920 stores, in advance, master data 922, which is a relationship for the position information for the movement destination of the target hole 33 and the position information for the dolly receiving portions 35A, 35B, and 35C of each of the lower raising/lowering stands 300 corresponding to the position information for the movement destination of the target holes 33. The storage unit 920 according to the present embodiment stores a program 921 and the master data 922. The master data 922 is acquired in advance in accordance with the shape of the component (the lower panel 32 in the present embodiment) and the position of the reference point (the target hole 33 in the present embodiment). In the master data 922 according to the present embodiment, the master data 922 is data collecting the position information for the dolly receiving portions 35A, 35B, and 35C in each of the lower raising/lowering stands 300 with respect to the virtual orthogonal coordinate system with reference to the position of the target hole 33 (position of the jig reference point 240) of the lower panel 32 in a state of being placed on the lower panel support part 200. In other words, in the master data 922 according to the present embodiment, a relationship between the amount of movement of the target hole 33 and the amounts of displacement of the dolly receiver portions 35A, 35B, and 33C in each of the lower raising/lowering stands 300 calculated according to the amount of movement of the target hole 33 is collected. The amount of displacement of the dolly receiving portions 35A, 35B, and 35C is represented, for example, as the amount of stroke of each of a total of 17 Y-axis servo devices, Z-axis servo devices, and X-axis servo devices.

The unit position information acquisition unit 930 acquires position information for the dolly receiving portions 35A, 35B, and 35C of each of the lower raising/lowering stands 300, based on the position information for the movement destination of the target hole 33 input to the input unit 910 and the master data 922 stored in the storage unit 920. The unit position information acquisition unit 930 includes an arithmetic device. The unit position information acquisition unit 930 operates based on the program 921. The unit position information acquisition unit 930 compares the input position information with the master data 922, calculates to acquire position information of each of the dolly receiving portions 35A, 35B, and 35C after the movement. Specifically, the position information for the movement destination of the target holes 33 in the virtual orthogonal coordinate system is acquired from the input position information for the movement destination of the target hole 33. Thereafter, from the position information for the movement destination of the target hole 33 in the virtual orthogonal coordinate system, the position information of the dolly receiving portions 35A, 35B, and 35C of each of the lower raising/lowering stands 300 in the virtual orthogonal coordinate system is acquired. Based on the acquired information, the amounts of movement from the current positions of the dolly receiving portions 35A, 35B, and 35C are acquired. The acquired information on the amount of movement of each of the dolly receiving portions 35A, 35B, and 35C is output to the movement command unit 940.

The movement command unit 940 simultaneously moves the dolly receiving portions 35A, 35B, and 35C of the plurality of lower raising/lowering stands 300, based on the information of the amount of movement of each of the dolly receiving portions 35A, 35B, and 35C acquired by the unit position information acquisition unit 930. The movement command unit 940 outputs the information of the amounts of movement of the dolly receiving portions 35A, 35B, and 35C to the lower raising/lowering stands 300 including the corresponding dolly receiving portions 35A, 35B, and 35C, respectively. Specifically, the movement command unit 940 instructs the amount of stroke necessary to adjust the Y-axis servo devices 41A and 41B, the Z-axis servo devices 42A, 42B, and 42C, and the X-axis servo device 43A.

In the aircraft structure manufacturing device 10 according to the first embodiment as described above, a worker first installs the rear spar 22 and the front spar 21. As illustrated in FIG. 4, the worker causes the front spar holding portion 600 to hold the front spar 21 and causes the rear spar holding portion 700 to hold the rear spar 22. In a state in which the front spar holding portion 600 is slightly moved back in the Y-axis direction away from the rear spar holding portion 700, one ends of the ribs 4 are fixed to the rear spar 22. Thereafter, the front spar holding portion 600 is moved forth in the Y-axis direction, and the other ends of the ribs 4 are fixed to the front spar 21. As a result, the front spar 21 and the rear spar 22 are integrated via the ribs 4 to form a skeleton structure. Note that in a state in which the rear spar 22 is held by the rear spar holding portion 700, the reference holes 22c formed in the rear spar 22 are in a state in which the central axis thereof is inclined with respect to the vertical direction.

The worker then positions the upper panel 31 and the lower panel 32 relative to the rear spar 22 and the front spar 21, respectively. In a state where the upper panel 31 is held by the upper panel adsorption unit 400, the worker inputs the position information for the movement destination of the target hole 33 of the upper panel 31 to the input unit 910. The unit position information acquisition unit 930 acquires the position information of the support parts in the upper raising/lowering stands 500 in the virtual orthogonal coordinate system, based on the position information for the movement destination of the target hole 33 of the upper panel 31 input to the input unit 910. The acquired position information of each of the support parts is output to the plurality of upper raising/lowering stands 500 via the movement command unit 940. As a result, the support parts that move by different amounts of movement are each moved together in the plurality of upper raising/lowering stands 500. As a result, the upper panel 31 adsorbed by the upper panel adsorption unit 400 moves to the designated position. Note that in a state in which the upper panel 31 is adsorbed by the upper panel adsorption unit 400, the target hole 33 formed in the upper panel 31 has an axis inclined with respect to the vertical direction.

The worker then drives the upper raising/lowering stands 500 to move the upper panel 31 until the target hole 33 of the upper panel 31 and the reference hole 22c are aligned. In a state where the target hole 33 of the upper panel 31 and the reference hole 22c are aligned, the upper panel 31 and the rear spar 22 are brought into contact with each other to stop movement of the upper panel 31. Thereafter, the worker fixes the tip end portion of the upper panel 31 and the tip end portion of the rear spar 22 by using fasteners (not illustrated) such as a bolt 521.

The worker then inputs the position information for the movement destination of the target hole 33 of the lower panel 32 to the input unit 910 with the lower panel support part 200 supporting the lower panel 32. The unit position information acquisition unit 930 acquires the position information of the dolly receiving portions 35A, 35B, and 35C in the lower raising/lowering stands 300 in the virtual orthogonal coordinate system, based on the position information for the movement destination of the target hole 33 of the lower panel 32 input to the input unit 910. The acquired position information of each of the dolly receiving portions 35A, 35B, and 35C is output to the plurality of lower raising/lowering stands 300 via the movement command unit 940. As a result, the dolly receiving portions 35A, 35B, and 35C that move by different amounts of movement are moved together in the plurality of lower raising/lowering stands 300. As a result, the lower panel 32 supported by the lower panel support part 200 moves to the designated position. Note that in a state in which the lower panel 32 is supported from below by the lower panel support part 200, the target hole 33 formed in the lower panel 32 has an axis inclined with respect to the vertical direction.

The worker then drives the lower raising/lowering stands 300 to move the lower panel 32 until the target hole 33 of the lower panel 32 and the reference hole 22c are aligned. In a state where the target hole 33 of the lower panel 32 and the reference hole 22c are aligned, the lower panel 32 and the rear spar 22 are brought into contact with each other to stop movement of the lower panel 32. Thereafter, the worker fixes the tip end portion of the lower panel 32 and the tip end portion of the rear spar 22 by using fasteners (not illustrated) such as a bolt 521.

According to the aircraft structure manufacturing device 10 as described above, by inputting the position information for movement destination of the target hole 33 to the input unit 910, the amounts of movement of the dolly receiving portions 35A, 35B, and 35C of the plurality of lower raising/lowering stands 300 and the support parts of the plurality of upper raising/lowering stands 500 are acquired collectively via the master data 922 by the unit position information acquisition unit 930. Based on the acquired amounts of movement of the plurality of dolly receiving portions 35A, 35B, and 35C and the amounts of movement of the support parts of the upper raising/lowering stands 500, the plurality of lower raising/lowering stands 300 and the plurality of upper raising/lowering stands 500 are driven simultaneously. As a result, the lower panel 32 and the upper panel 31 can be moved to the designated position. Accordingly, the lower panel 32 and the upper panel 31 can be moved to a designated position relative to each of the plurality of lower raising/lowering stands 300 and upper raising/lowering stands 500 without inputting drive instructions. That is, the positions of the lower panel 32 and the upper panel 31 can be moved by driving together the plurality of lower raising/lowering stands 300 and the upper raising/lowering stands 500 through a single input operation. As a result, high-precision positioning of the lower panel 32 and the upper panel 31 relative to the rear spar 22 can be performed by simple operation.

Focusing the lower panel 32 and the upper panel 31 enables the panel 3 and the rear spar 22 to be positioned with high precision by simple operation of one worker even with a large structure such as a wing of an aircraft.

Second Embodiment

Next, a second embodiment of a vessel of the present invention will be described with reference to FIGS. 10 to 15. The aircraft structure manufacturing device 10A according to the second embodiment differs from the first embodiment in that the aircraft structure manufacturing device 10A further includes a first positioning device 11 and a second positioning device 12. Therefore, in the description of the second embodiment, same parts as the first embodiment will be described using same reference signs, and overlapping descriptions will be omitted.

Figure 10:
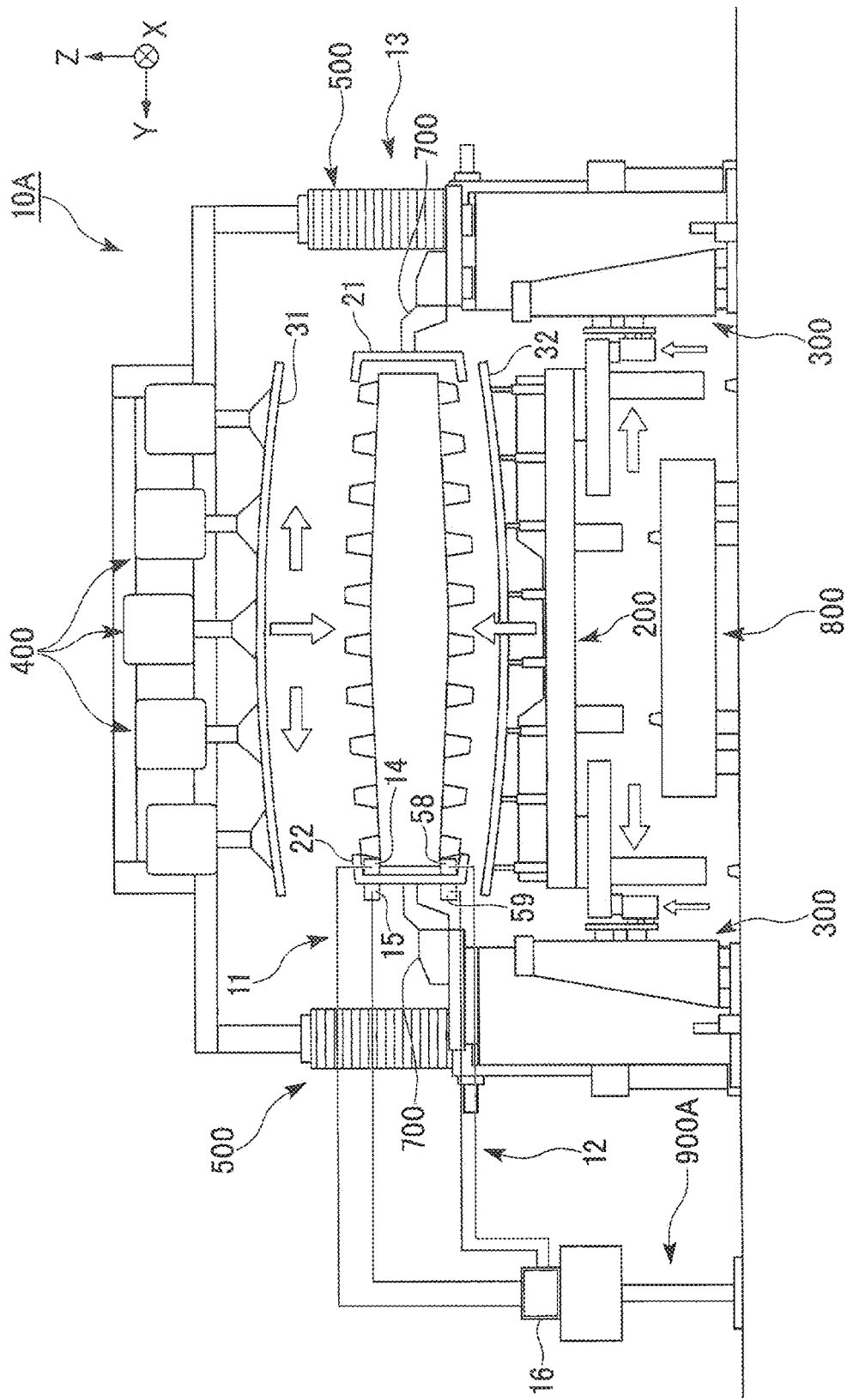
FIG. 10 is a schematic front view illustrating a configuration of an aircraft structure manufacturing device according to the second embodiment of the present invention.

As illustrated in FIG. 10, the aircraft structure manufacturing device 10A according to the second embodiment is further provided with the first positioning device 11 and the second positioning device 12.

The first positioning device 11 positions the rear spar 22 and the upper panel 31 that constitute the main wing 1. The first positioning device 11 includes a base end portion camera unit 14 provided on the base end portion of the rear spar 22 constituting the main wing 1, a tip end portion camera unit 15 provided on the tip end portion of the rear spar 22, and a monitor screen (display unit) 16 which is electrically connected to the base end portion camera unit 14 and the tip end portion camera unit 15 via wiring.

Figure 11:
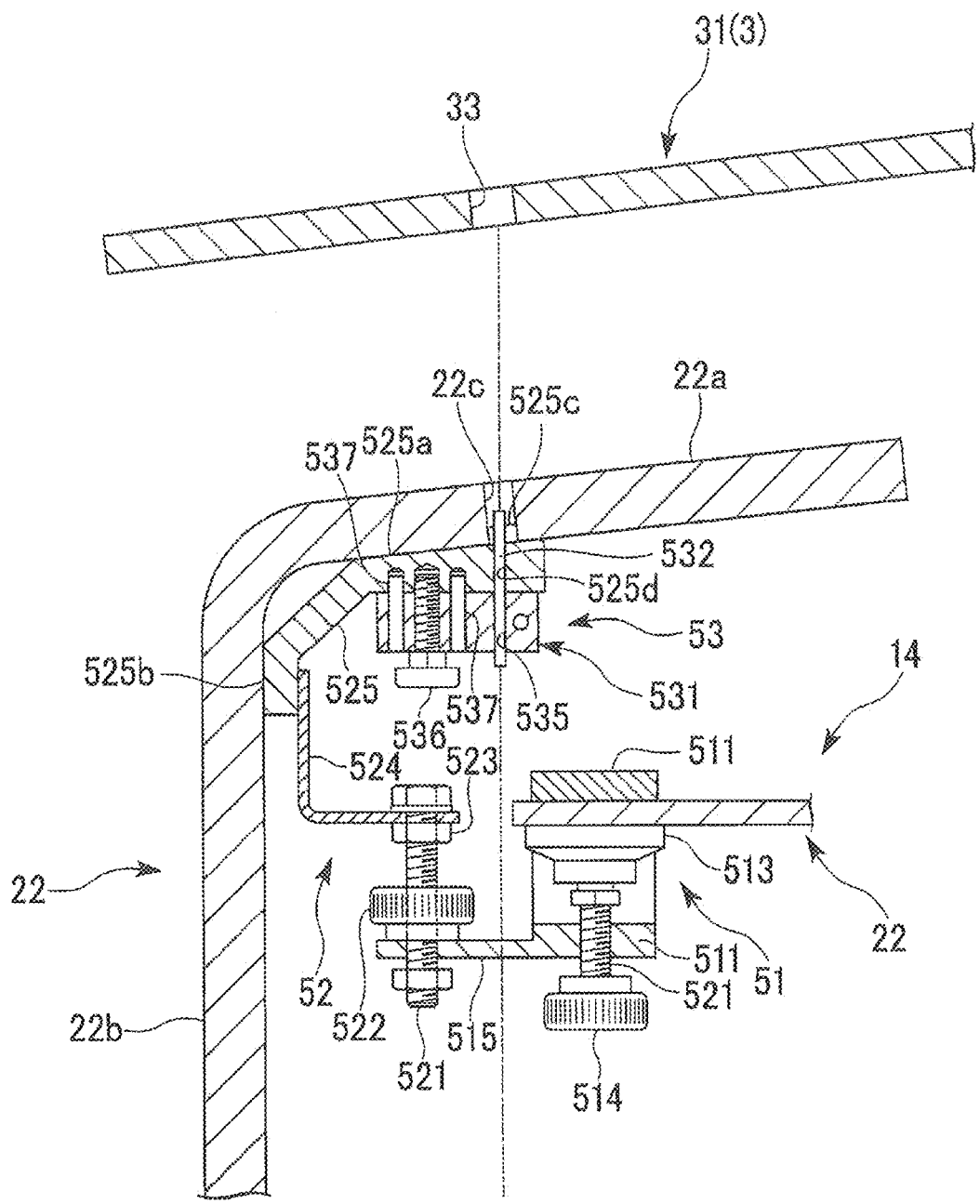
FIG. 11 is a schematic cross-sectional view illustrating an attached state of a base end portion camera unit to a rear spar.

Here, FIG. 11 is a schematic cross-sectional view illustrating an attached state of the base end portion camera unit 14 to the rear spar 22. Note that in the present embodiment, the base end portion camera unit 14 and the tip end portion camera unit 15 are disposed at the base end portion and the tip end portion of the rear spar 22, but alternatively, the base end portion camera unit 14 and the tip end portion camera unit 15 may be disposed at the base end portion and the tip end portion of the front spar 21.

The base end portion camera unit 14 is provided on the rear spar 22. The base end portion camera unit 14 acquires an image of the target hole 33 formed in the panel 3 as a reference point. As illustrated in FIG. 11, the base end portion camera unit 14 includes a base end clamping portion 51 fixed to the rear spar 22, a base end positioning portion 52 positioned relative to the inner surface of the rear spar 22, and a base end camera holding portion 53 that holds the camera.

The base end clamping portion 51 includes a base end abutting piece 511, a base end shaft 512, a base end pressing member 513, a base end first operating knob 514, and a base end protruding piece 515.

According to the base end clamping portion 51 configured in this manner, when the base end first operating knob 514 is rotated, the base end shaft 512 moves back and forth relative to the base end abutting piece 511, and the interval between the base end pressing member 513 and the base end abutting piece 511 changes. As a result, the base end portion camera unit 14 can be attached to the rear spar 22 by clamping a predetermined location of the rear spar 22 (for example, a portion provided protruding to the inner surface of the rear spar 22) between the base end pressing member 513 and the base end abutting piece 511.

The base end positioning portion 52 includes a bolt 521, a second operating knob 522, a nut 523, a support bracket 524, and a base end reference block 525.

According to the base end positioning portion 52 configured in this manner, when the bolt 521 is rotated by rotating the second operating knob 522, the nut 523 screwed therewith moves along the shaft of the bolt 521. As a result, the base end reference block 525 fixed to the nut 523 can be moved in the vertical direction.

The base end reference block 525 includes a first reference surface 525a that abuts the parallel piece 22a of the rear spar 22, a second reference surface 525b that abuts the connection piece 22b of the rear spar 22, a convex portion 525c provided protruding from the first reference surface 525a, and a camera insertion hole 525d for inserting the base end camera 532.

Here, the angle formed by the first reference surface 525a and the second reference surface 525b is formed to be substantially equal to the angle formed by the parallel piece 22a and the connection piece 22b of the rear spar 22. The cross-sectional shape of the convex portion 525c is formed to coincide with the cross-sectional shape of the reference holes 22c formed in the parallel pieces 22a.

The base end camera holding portion 53 includes a base end camera holder 531 attached to the base end reference block 525, and a base end camera (imaging unit) 532 held by the base end camera holder 531.

The base end camera holder 531 includes a camera fixing hole 535 in which the base end camera 532 is fixed, a fixing screw 536 for fixing to the base end reference block 525, and a pair of positioning pins 537 that are provided to protrude on both sides of the fixing screw 536. The base end camera holder 531 configured in this manner is positioned by inserting the pair of positioning pins 537 into the base end reference block 525, and the fixing screw 536 is screwed onto the base end reference block 525 so the base end camera holder 531 is fixed to the inner side surface of the base end reference block 525.

The base end camera 532 acquires an image of the target hole 33 formed in the upper panel 31. The base end camera 532 has an elongated shape with a substantially circular cross section. The base end camera 532 is fixed in a state of being inserted into the camera fixing hole 535 of the base end camera holder 531. The base end camera 532 is arranged so as to protrude to the back side of the base end camera holder 531, penetrate the camera insertion hole 525d and the convex portion 525c of the base end reference block 525, and protrude into the reference holes 22c formed in the parallel pieces 22a of the rear spar 22. As a result, the base end camera 532 is in a state of being oriented vertically upward. Note that when attaching the base end camera 532 to the base end camera holder 531, it is desirable to fix the base end camera 532 after the base end camera 532 is positioned in the circumferential direction of the camera fixing hole 535.

Figure 12:
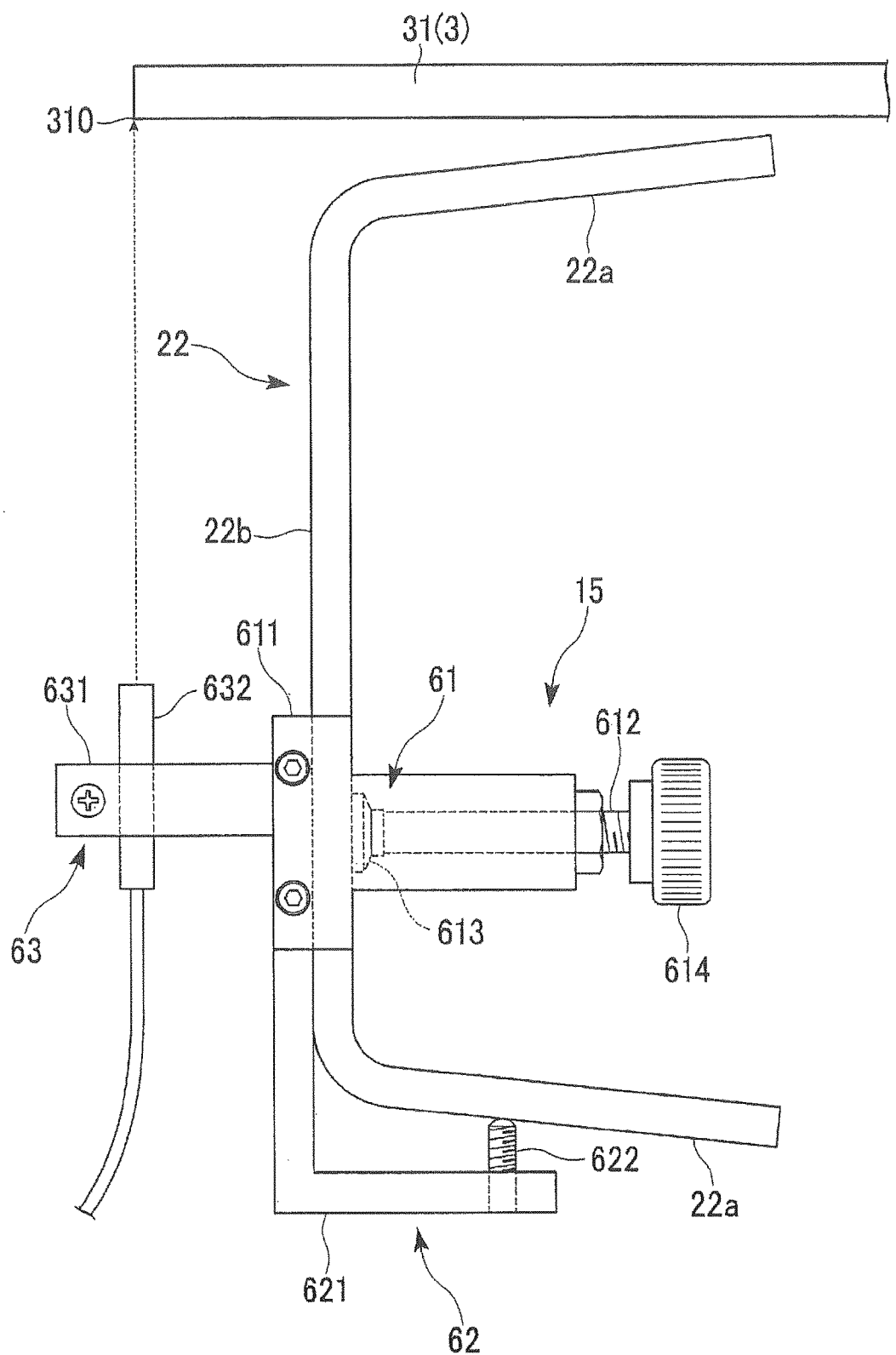
FIG. 12 is a schematic cross-sectional view illustrating an attached state of a tip end portion camera unit to the rear spar.

On the other hand, FIG. 12 is a schematic cross-sectional view illustrating an attached state of the tip end portion camera unit 15 to the rear spar 22. The tip end portion camera unit 15 includes a tip end clamping portion 61 fixed to the rear spar 22, a tip end positioning portion 62 positioned relative to the outer surface of the rear spar 22, and a tip end camera holding portion 63 that holds the tip end camera 632.

The tip end clamping portion 61 includes a tip end abutting piece 611 that abuts the outer surface of the connection piece 22b that constitutes the rear spar 22, a tip end shaft 612 screwed onto the tip end abutting piece 611, a tip end pressing member 613 provided at one end of the tip end shaft 612, and a tip end first operating knob 614 provided at the other end of the tip end shaft 612.

According to the tip end clamping portion 61 configured in this manner, when the tip end first operating knob 614 is rotated, the tip end shaft 612 moves back and forth relative to the tip end abutting piece 611, and the interval between the tip end pressing member 613 and the tip end abutting piece 611 changes. This allows the tip end portion camera unit 15 to be attached to the rear spar 22 by clamping a predetermined location of the rear spar 22 (for example, the connection piece 22b) between the tip end pressing member 613 and the tip end abutting piece 611.

The tip end positioning portion 62 includes an L-shaped tip end reference block 621 provided to be able to move back and forth along the connection piece 22b of the rear spar 22, and a tip end positioning convex portion 622 provided protruding inward from the tip end reference block 621.

The tip end camera holding portion 63 includes a tip end camera holder 631 attached to the tip end reference block 621 of the tip end positioning portion 62, and a tip end camera (imaging unit) 632 that is inserted and fixed to the tip end camera holder 631 to face vertically upward. The tip end camera 632 acquires an image of an edge 310 of the upper panel 31.

The monitor screen 16 displays an image acquired by the tip end camera 632 and the base end camera 532, and a preset marking described below.

The second positioning device 12 positions the rear spar 22 and the lower panel 32 relative to each other. The second positioning device 12 illustrated in FIG. 10 includes a base end portion camera unit 58 provided on the base end portion of the rear spar 22, and a tip end portion camera unit 59 provided at the tip end portion of the rear spar 22. The base end portion camera unit 58 and the tip end portion camera unit 59 are each electrically connected to the monitor screen (display unit) 16 via wiring. Note that the configuration of each of these components is the same as the first positioning device 11, and thus, descriptions thereof will be omitted here.

Figure 13:
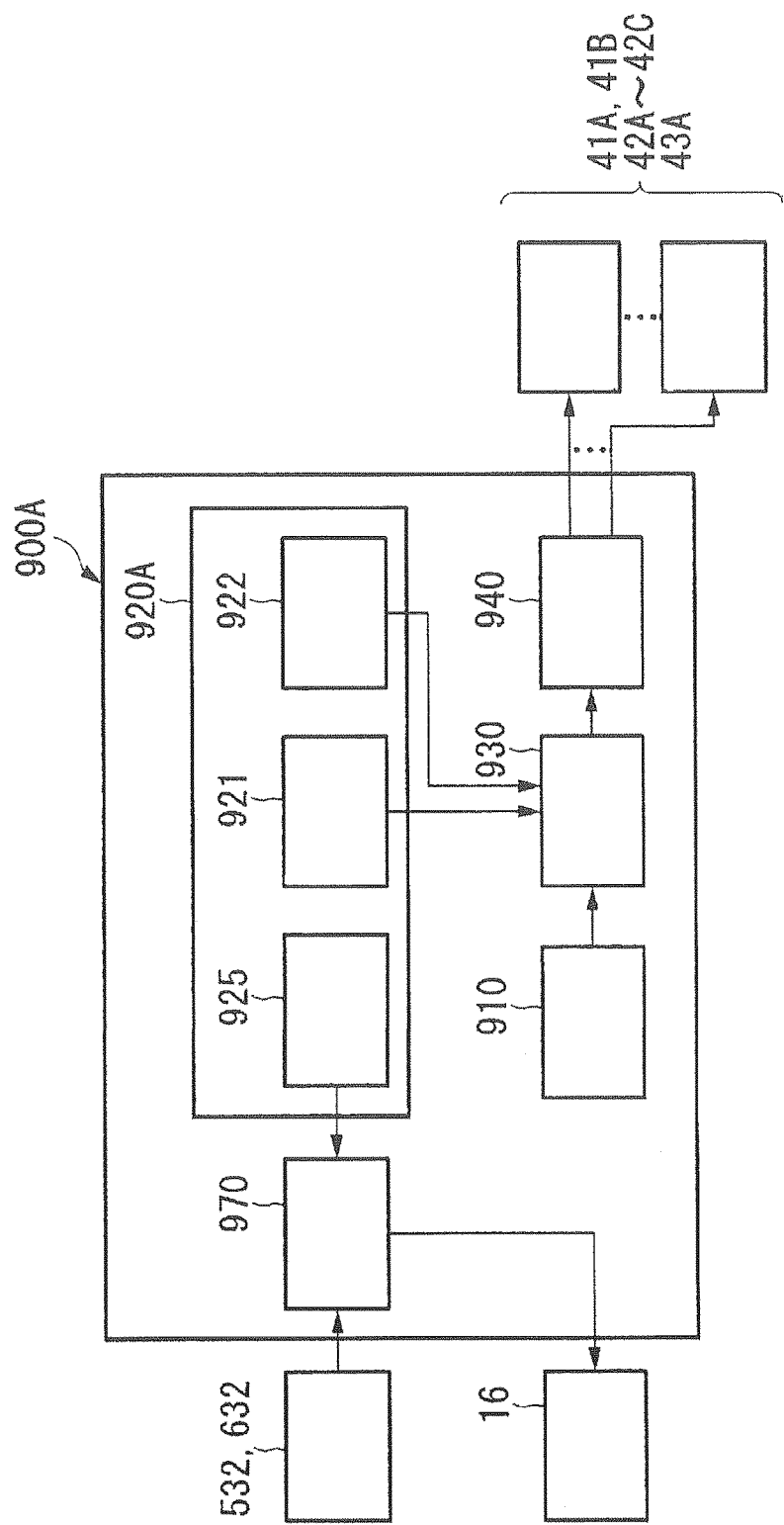
FIG. 13 is a block diagram of a control unit according to the second embodiment.

The control unit 900A according to the second embodiment controls the position of the support parts in the plurality of raising/lowering stands. The control unit 900A inputs the amount of movement of the reference point of the component, based on the images captured by the base end camera 532 and the tip end camera 632. As illustrated in FIG. 13, the control unit 900A according to the second embodiment includes an input unit 910, a storage unit 920A, a composite image generation unit 970, a unit position information acquisition unit 930, and a movement command unit 940.

The storage unit 920A stores marking information 925 in addition to the program 921 and the master data 922. The marking information 925 is position information of the preset marking. The marking information 925 according to the present embodiment is position information of the reference hole 22c, which is a movement destination to which the target hole 33 are aligned.

The composite image generation unit 970 generates a composite image by combining an image input from the base end camera 532 or the tip end camera 632 and the marking information 925 in the storage unit 920A. The composite image generation unit 970 according to the present embodiment generates, based on the marking information 925, a composite image in which a total of four target lines including two in the vertical direction and two in the horizontal direction are displayed. The composite image generation unit 970 outputs the generated composite image information to the monitor screen 16. Specifically, the composite image generation unit 970 causes the target line to be displayed on the monitor screen 16 so that a center position surrounded by two lines in the vertical direction and two lines in the horizontal direction is position information of the reference hole 22c.

In the aircraft structure manufacturing device 10A according to the second embodiment as described above, the worker installs the base end camera 532 and the tip end camera 632 on the rear spar 22. The worker installs the base end portion camera unit 14 that constitutes the first positioning device 11 on the base end portion of the rear spar 22 and the tip end portion camera unit 15 on the tip end portion of the rear spar 22.

As will be described in more detail, as illustrated in FIG. 11, a portion provided protruding to the inner surface of the rear spar 22 is clamped by the base end clamping portion 51 of the base end portion camera unit 14. This temporarily fixes the base end portion camera unit 14 to the rear spar 22. The second operating knob 522 of the base end positioning portion 52 is manipulated to move the base end reference block 525 upward. As a result, the first reference surface 525a is brought into contact with the parallel piece 22a, and the second reference surface 525b is brought into contact with the connection piece 22b. At this time, the convex portion 525c protruding to the first reference surface 525a is fitted into the reference hole 22c formed in the parallel piece 22a. In this way, by precisely positioning the base end portion camera unit 14 relative to the rear spar 22, the base end camera 532 held by the base end camera holding portion 53 is oriented vertically upward. Note that, although not illustrated in detail in the drawings, the second reference surface 525b is adjusted in advance so as to abut the connection piece 22b by attaching a predetermined number of the plate-like shims having a predetermined thickness overlaid thereon.

As illustrated in FIG. 12, the worker clamps the connection piece 22b of the rear spar 22 with the tip end clamping portion 61 of the tip end portion camera unit 15 and precisely positioning the tip end portion camera unit 15 relative to the rear spar 22 so that the tip end camera 632 held by the tip end camera holding portion 63 is oriented vertically upward.

Note that, similar to the first positioning device 11, the base end portion camera unit 58 and the tip end portion camera unit 59 constituting the second positioning device 12 are also provided at the base end portion and the tip end portion of the rear spar 22.

Thereafter, similar to the first embodiment, the worker installs the rear spar 22 and the front spar 21. After the front spar 21 and the rear spar 22 are integrated via the ribs 4, the upper panel 31 and the lower panel 32 are respectively positioned with respect to the rear spar 22 and the front spar 21. In a state where the upper panel 31 is held by the upper panel adsorption unit 400, the worker inputs the position information for the movement destination of the target hole 33 of the upper panel 31 to the input unit 910. The unit position information acquisition unit 930 acquires the position information of the support parts in the upper raising/lowering stands 500 in the virtual orthogonal coordinate system, based on the position information for the movement destination of the target hole 33 of the upper panel 31 input to the input unit 910. The acquired position information of each of the support parts is output to the plurality of upper raising/lowering stands 500 via the movement command unit 940. As a result, the support parts that move by different amounts of movement are moved together in the plurality of upper raising/lowering stands 500. As a result, the upper panel 31 adsorbed by the upper panel adsorption unit 400 moves to the designated position. Note that in a state in which the upper panel 31 is adsorbed by the upper panel adsorption unit 400, the target hole 33 formed in the upper panel 31 has an axis inclined with respect to the vertical direction.

Figure 14:
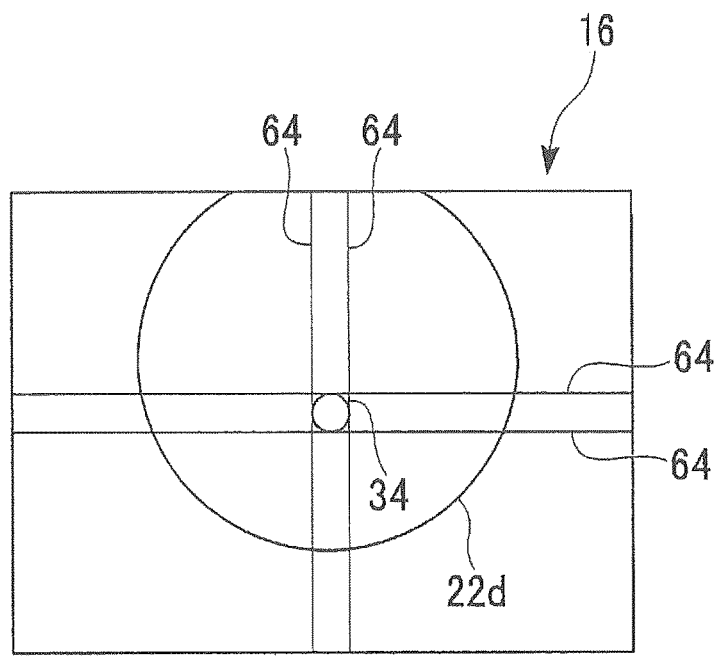
FIG. 14 is a diagram illustrating a composite image displayed on a monitor screen, where an image acquired by a base end camera is utilized as the composite image.

In this state, when the target hole 33 of the upper panel 31 is captured by the base end camera 532, the composite image generated by the composite image generation unit 970 is displayed on the monitor screen 16. FIG. 14 is a diagram illustrating a composite image displayed on the monitor screen 16. An image acquired by the base end camera 532, that is, an image of the target hole 33 formed in the upper panel 31, is displayed on the monitor screen 16, and a total of four target lines 64 are displayed including two in the vertical direction and two in the horizontal direction. Note that in FIG. 15, the image of the movement destination acquired by the base end camera 532, that is, the opening edge 22d of the reference hole 22c formed in the rear spar 22 is also displayed.

The worker checks whether the target hole 33 has moved to the specified movement destination from the position relationship between the image of the target hole 33 displayed on the monitor screen 16 and the four target lines 64. In a case that the position of the target hole 33 is not in contact with the four target lines 64, the worker determines that the target hole 33 has not moved to the specified movement destination, and again inputs the position information of the movement destination of the target hole 33 to the input unit 910. Thereafter, such a process is repeated until the image of the target hole 33 displayed on the monitor screen 16 coincides with the image of the reference hole 22c in contact with the four target lines 64.

Note that the image of the target hole 33 gradually increases as the upper panel 31 approaches the rear spar 22. Accordingly, the monitor screen 16 is enabled to switch modes depending on such increase, and the interval between the two vertical target lines 64 and the interval between the two horizontal target lines 64 are widened for each mode switching.

In a case where the image of the target hole 33 and the image of the reference hole 22c coincide, the worker positions the tip end portion of the upper panel 31 relative to the tip end portion of the rear spar 22 by rotating the upper panel 31 in a horizontal plane with reference to the image of the target hole 33.

Figure 15:
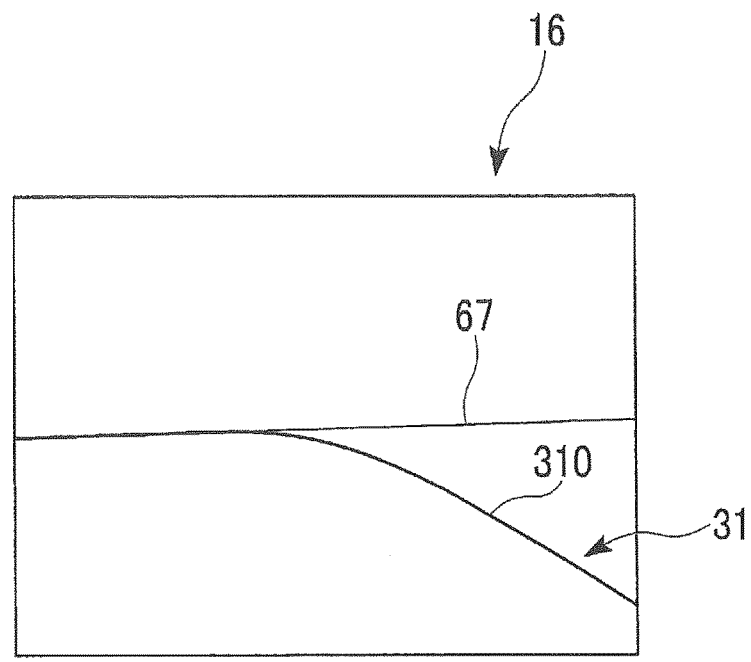
FIG. 15 is a diagram illustrating a composite image displayed on a monitor screen, where an image acquired by a tip end camera is utilized as the composite image.

At this time, the worker switches the display of the monitor screen 16, and causes the image acquired by the tip end camera 632 of the tip end portion camera unit 15 constituting the first positioning device 11 to be displayed. Here, FIG. 15 is a diagram illustrating a composite image displayed on the monitor screen 16. The image acquired by the tip end camera 632, that is, the edge 310 of the upper panel 31, is displayed on the monitor screen 16, and a single horizontal target line 67 stored by the storage means 60 in advance is displayed. The worker rotates the upper panel 31 in a horizontal plane until the edge 310 of the upper panel 31 and the target line 67 coincide. As a result, the upper panel 31 adsorbed by the upper panel adsorption unit 400 moves to the designated position. The tip end portion of the upper panel 31 and the tip end portion of the rear spar 22 are then fixed.

As illustrated in FIG. 10, the worker then inputs the position information for the movement destination of the target hole 33 of the lower panel 32 to the input unit 910 with the lower panel support part 200 supporting the lower panel 32. The unit position information acquisition unit 930 acquires the position information of the dolly receiving portions 35A, 35B, and 35C in the lower raising/lowering stands 300 in the virtual orthogonal coordinate system, based on the position information for the movement destination of the target hole 33 of the lower panel 32 input to the input unit 910. The acquired position information of each of the dolly receiving portions 35A, 35B, and 35C is output to the plurality of lower raising/lowering stands 300 via the movement command unit 940. As a result, the dolly receiving portions 35A, 35B, and 35C that move by different amounts of movement are each moved together in the plurality of lower raising/lowering stands 300. As a result, the lower panel 32 supported by the lower panel support part 200 moves to the designated position. Note that in a state in which the lower panel 32 is supported from below by the lower panel support part 200, the target hole 33 formed in the lower panel 32 has an axis inclined with respect to the vertical direction.

At this time, the target hole 33 of the lower panel 32 is captured by the base end camera 532, and the composite image generated by the composite image generation unit 970 is displayed on the monitor screen 16. Thereafter, the same steps as in adjusting the position of the upper panel 31 are performed.

According to the aircraft structure manufacturing device 10A according to the second embodiment as described above, by displaying the image of the target hole 33 on the monitor screen 16, the actual position of the upper panel 31 or the lower panel 32 can be easily confirmed in addition to the operation and effect of the first embodiment. Furthermore, the positioning of the upper panel 31 and the lower panel 32 can be performed sensory by simple operation of moving the members relative to each other by aligning the image of the target hole 33 displayed on the monitor screen 16 with the target lines on the monitor screen 16.

Since such operations can be performed by one worker, reduction in labor costs can be achieved.

Note that in the present embodiment, the upper panel 31 is lowered or the lower panel 32 is raised while the worker views the monitor screen 16. However, no such limitation is intended, and the control unit 900A may automate the lowering of the upper panel 31 and the raising of the lower panel 32. In other words, the position relationship between the target hole 33 and the target line 64 in the monitor screen 16, or the position relationship between the edge 310 and the target line 67 may be detected, and based on the detection result, the control unit 900A may control the operation of the upper panel adsorption unit 400 and the lower panel support part 200, and the like. In this case, for example, the input unit 910 may acquire the position information for the movement destination by aligning the image of the target hole 33 acquired by the base end camera 532 and the tip end camera 632 to the preset marking. The configuration may be used in which the position information for the movement destination is acquired from the position of the target hole 33 displayed on the monitor screen 16.

Another Modification of Embodiment

While the above has described embodiments of the present invention in detail with reference to the drawings, each configuration of each embodiment and the combinations thereof are merely examples, and additions, omissions, substitutions, and other changes may be made without deviating from the spirit and scope of the present invention. The present invention is not to be considered as being limited by the foregoing description but is only limited by the scope of the appended claims.

Note that in the present embodiments, in order to position the upper panel 31 and the lower panel 32 relative to the rear spar 22, the upper panel 31 is lowered or the lower panel 32 is raised, but conversely, the rear spar 22 may be raised toward the upper panel 31 or lowered toward the lower panel 32.

In the present embodiments, position information for a movement destination of the target hole 33 is input to the input unit 910 as a reference point provided on a component, but the position information of the movement destination of the input reference point is not limited to the target hole 33. For example, any position on the component may be set as a reference point. In this case, the input unit 910 may be inputted with position information for a movement destination of any position on the component.

Figure 16:
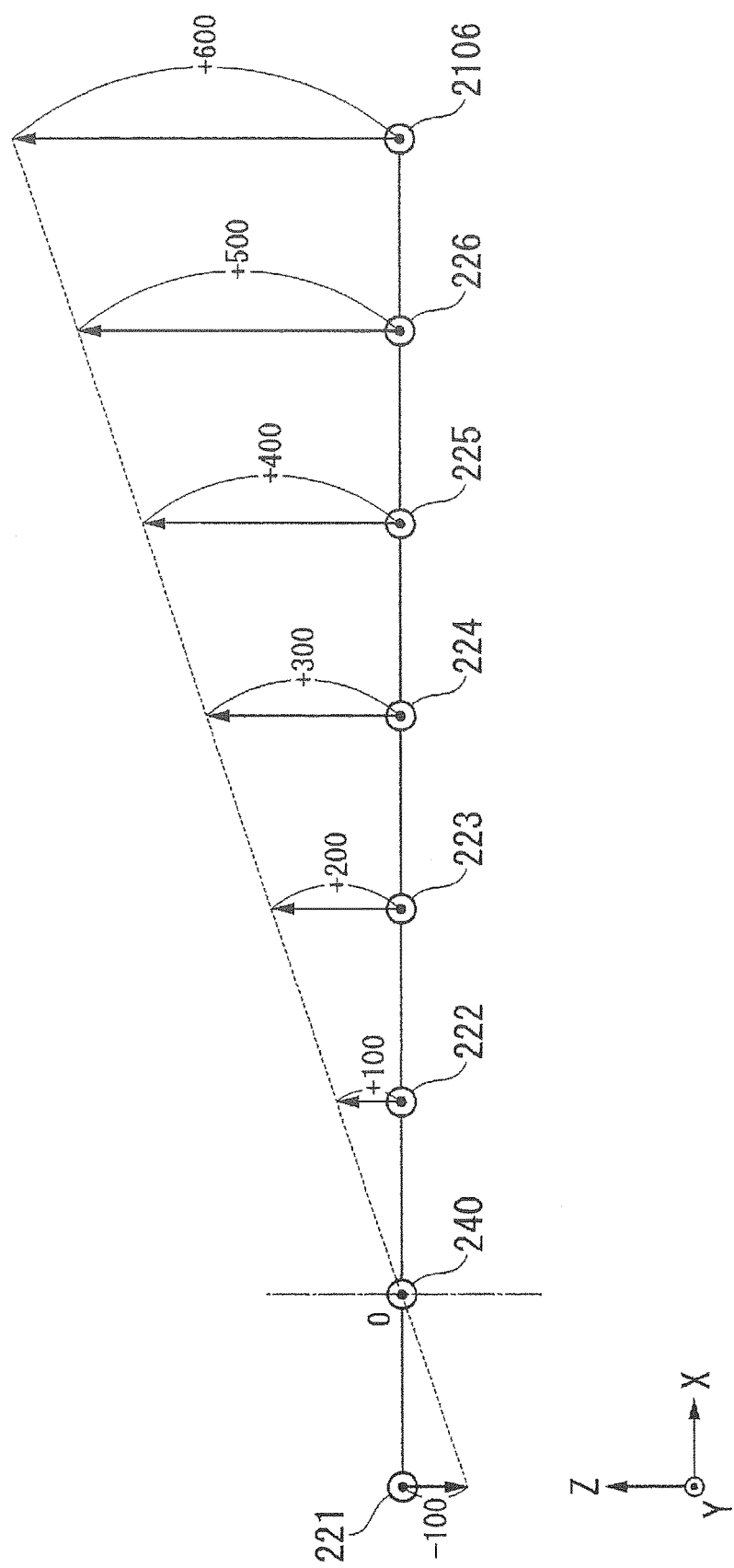
FIG. 16 is an explanatory diagram schematically illustrating an example of a master data.

Specifically, as illustrated in FIG. 16, a case will be described in which the master data 922 is set in a linear relationship such as descending from the tip end toward the base end, and the reference point is the tip end of the lower panel 32. In this case, the position information for the movement destination of the tip end of the lower panel 32 is input to the input unit 910, rather than the position information for the movement destination of the target hole 33.

In such a condition, for example, in a case that the tip end of the lower panel 32 is raised by +600 mm in the Z direction, the main body blade end portion 210b of the dolly main body 210 on which the lower panel 32 is mounted is raised by +600 mm in the Z direction. As a result, in the master data 922, the amount of movement of the sixth rear supported part 226 in the Z direction is +500 mm, the amount of movement of the fifth rear supported part 225 in the Z direction is +400 mm, the amount of movement of the fourth rear supported part 224 in the Z direction is +300 mm, the amount of movement of the third rear supported part 223 in the Z direction is +200 mm, the amount of movement of the second rear supported part 222 in the Z direction is +200 mm, the amount of movement of the jig reference point 240 in the Z direction is 0 mm (not moved), and the amount of movement of the first rear supported part 221 in the Z direction is −100 mm.

Based on the master data 922, the position information of each of the dolly receiving portions 35A, 35B, and 35C after moving is calculated to acquire by the unit position information acquisition unit 930. The acquired information on the amount of movement of each of the dolly receiving portions 35A, 35B, and 35C is output to the movement command unit 940. The movement command unit 940 instructs the amount of stroke necessary to adjust the Z-axis servo devices 42A, 42B, and 42C, respectively. This allows the lower panel support part 200 to move so that the lower panel 32 is moved to a designated position.

INDUSTRIAL APPLICABILITY

According to the aircraft structure manufacturing device described above, high-precision positioning can be performed with simple operation.

REFERENCE SIGNS LIST

1 Main wing
2 Spar
21 Front spar
22 Rear spar
22a Parallel piece
22b Connection piece
22c Reference hole
22d Opening edge
3 Panel
31 Upper panel
310 Edge
32 Lower panel
3a Panel main body
3b Stringer
33 Target hole
4 Rib
10, 10A Aircraft structure manufacturing device
200 Lower panel support part
210 Dolly main body
210a Main body trunk portion
210b Main body blade end portion
210c Main body leading edge portion
210d Main body trailing edge portion
221 First rear supported part
222 Second rear supported part
223 Third rear supported part
224 Fourth rear supported part
225 Fifth rear supported part
226 Sixth rear supported part
231 First front supported part
232 Second front supported part
233 Third front supported part
234 Fourth front supported part
235 Fifth front supported part
236 Sixth front supported part
240 Jig reference point
300 Lower raising/lowering stand
30A First lower raising/lowering stand
31A, 31B Base
32A, 32B Y-axis sliding unit
33A, 33B, 33C Z-axis sliding unit
34A X-axis sliding unit
35A, 35B, 35C Dolly receiving portion
36A, 36B, 36C Receiving seat
37A, 37B, 37C Pin
41A, 41B Y-axis servo device
42A, 42B, 42C Z-axis servo device
43A X-axis servo device
30B Second lower raising/lowering stand
30C Third lower raising/lowering stand
38C Sliding unit support part
45 Servo motor
46 Ball screw
400 Upper panel adsorption unit
500 Upper raising/lowering stand
600 Front spar holding portion
700 Rear spar holding portion
800 Transport unit
900, 900A Control unit
910 Input unit
920, 920A Storage unit
921 Program
922 Master data
930 Unit position information acquisition unit
940 Movement command unit
11 First positioning device
14 Base end portion camera unit
51 Base end clamping portion
511 Base end abutting piece
512 Base end shaft
513 Base end pressing member
514 Base end first operating knob
515 Base end protruding piece
52 Base end positioning portion
521 Bolt
522 Second operating knob
523 Nut
524 Support bracket
525 Base end reference block
525a First reference surface
525b Second reference surface
525c Convex portion
525d Camera insertion hole
53 Base end camera holding portion
531 Base end camera holder
535 Camera fixing hole 536 Fixing screw
537 Positioning pin
532 Base end camera
15 Tip end portion camera unit
61 Tip end clamping portion
611 Tip end abutting piece
612 Tip end shaft
613 Tip end pressing member
614 Tip end first operating knob
62 Tip end positioning portion
621 Tip end reference block
622 Tip end positioning convex portion
63 Tip end camera holding portion
631 Tip end camera holder
632 Tip end camera
16 Monitor screen
12 Second positioning device
925 Marking information
970 Composite image generation unit

The invention claimed is:

1. An aircraft structure manufacturing device comprising: a jig configured to support components of an aircraft structure; a plurality of raising/lowering stands arranged apart from each other in a horizontal direction, the plurality of raising/lowering stands including support parts being movable in a state in which the jig is supported; and a control unit configured to control positions of the support parts of the plurality of raising/lowering stands on one virtual orthogonal coordinate system, wherein the control unit includes: an input unit configured to input position information for a movement destination for moving a reference point provided on the components of the aircraft structure; a storage unit configured to store, in advance, master data, which is a relationship for the position information for the movement destination and position information for the support parts of the plurality of raising/lowering stands; a unit position information acquisition unit configured to acquire the position information for the support parts of the plurality of raising/lowering stands, based on the position information for the movement destination input and the master data stored in the storage unit; and a movement command unit configured to simultaneously move the support parts of the plurality of raising/lowering stands, based on the position information for the support parts acquired by the unit position information acquisition unit, wherein the components include an upper panel, a lower panel, a rear spar, and a front spar, wherein the plurality of raising/lowering stands includes upper raising/lowering stands and lower raising/lowering stands which are configured to position the upper panel and the lower panel to the rear spar and the front spar, and wherein the control unit is configured to control the positions of the support parts of the plurality of raising/lowering stands so as to be simultaneously moved by different amounts of movement by a single input to the input unit, and to control and limit an operation of the upper raising/lowering stands and the lower raising/lowering stands so as not to operate, when position information of the reference points of the components of the aircraft structure and position information of the master data do not match within a range of a composite image comprising two lines in a vertical direction and two lines in the horizontal direction composed of the master data.

2. The aircraft structure manufacturing device according to claim 1, comprising: an imaging unit configured to acquire an image of the reference point; a display unit configured to display an image acquired by the imaging unit and a preset marking, and a composite image generation unit configured to output gap information derived from the position information of the reference points of the upper panel and the lower panel acquired by the imaging unit, and the position information of the master data to the input unit.

* * * * *